US012809903B2

(12) United States Patent
Pentyala et al.

(10) Patent No.: US 12,809,903 B2
(45) Date of Patent: Nov. 24, 2026

(54) CONTEXTUAL RETRIEVAL FOR MULTI-TENANT RETRIEVAL-AUGMENTED GENERATION (RAG) WITH ADAPTIVE LEARNING

(71) Applicant: Salesforce, Inc., San Francisco, CA (US)

(72) Inventors: Shiva Kumar Pentyala, San Francisco, CA (US); Bin Bi, Bellevue, WA (US); Regunathan Radhakrishnan, San Francisco, CA (US); Shashank Harinath, Bangalore (IN); Sitaram Asur, San Francisco, CA (US); Na Cheng, Bellevue, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/938,092

(22) Filed: Nov. 5, 2024

(65) Prior Publication Data

US 2026/0127205 A1 May 7, 2026

(51) Int. Cl.
*G06F 16/334* (2025.01)
*G06F 16/332* (2019.01)

(52) U.S. Cl.
CPC ...... *G06F 16/3347* (2019.01); *G06F 16/3326* (2019.01); *G06F 16/3346* (2019.01)

(58) Field of Classification Search
None
See application file for complete search history.

(56) References Cited

U.S. PATENT DOCUMENTS

| | | | | |
|---|---|---|---|---|
| 12,353,469 | B1 * | 7/2025 | Mahabadi | G06F 16/332 |
| 2021/0141799 | A1 * | 5/2021 | Steedman Henderson | G06F 16/24578 |
| 2024/0370476 | A1 * | 11/2024 | Madisetti | G06F 16/3329 |
| 2025/0165463 | A1 * | 5/2025 | Brenner | G06F 16/242 |
| 2025/0190459 | A1 * | 6/2025 | Conway | G06F 16/3329 |
| 2025/0292110 | A1 * | 9/2025 | Jain | G06F 16/3338 |
| 2025/0315488 | A1 * | 10/2025 | Baek | G06F 16/93 |
| 2025/0322407 | A1 * | 10/2025 | Morishige | G06F 16/33 |

* cited by examiner

*Primary Examiner* — Son T Hoang
(74) *Attorney, Agent, or Firm* — Holland & Hart, LLP.

(57) ABSTRACT

A system may support retrieval-augmented generation (RAG) for a large language model (LLM). The system may use adaptive learning to improve the RAG process. For example, the system may implement a context-based embedding function to contextualize the RAG for the specific LLM or a specific tenant or user using the LLM. The context-based embedding function may project document vectors from a generic vector space into a context-based vector space for document retrieval. The system may retrieve a document using the context-based vector space to provide additional contextual information to the LLM to improve the LLM's output. The system may adaptively train the context-based embedding function based on the LLM, user feedback, or both. For example, the system may train the context-based embedding function to improve alignment of document retrieval likelihoods with confidence metrics for the outputs of the LLM.

20 Claims, 10 Drawing Sheets

CONTEXTUAL RETRIEVAL FOR MULTI-TENANT RETRIEVAL-AUGMENTED GENERATION (RAG) WITH ADAPTIVE LEARNING

FIELD OF TECHNOLOGY

The present disclosure relates generally to database systems and data processing, and more specifically to contextual retrieval for multi-tenant retrieval-augmented generation (RAG) with adaptive learning.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Some systems may use retrieval-augmented generation (RAG) to improve generative artificial intelligence (AI) results. For example, RAG may retrieve one or more documents that provide additional context to a large language model (LLM). However, in some cases, a retrieved document may introduce an error into the system (e.g., based on the document being irrelevant or otherwise misleading), and the error may propagate to the results of the LLM based on the LLM using the document as context. Such errors may cause hallucinations at the LLM or otherwise negatively affect the accuracy or effectiveness of the LLM.

DETAILED DESCRIPTION

Figure 1:
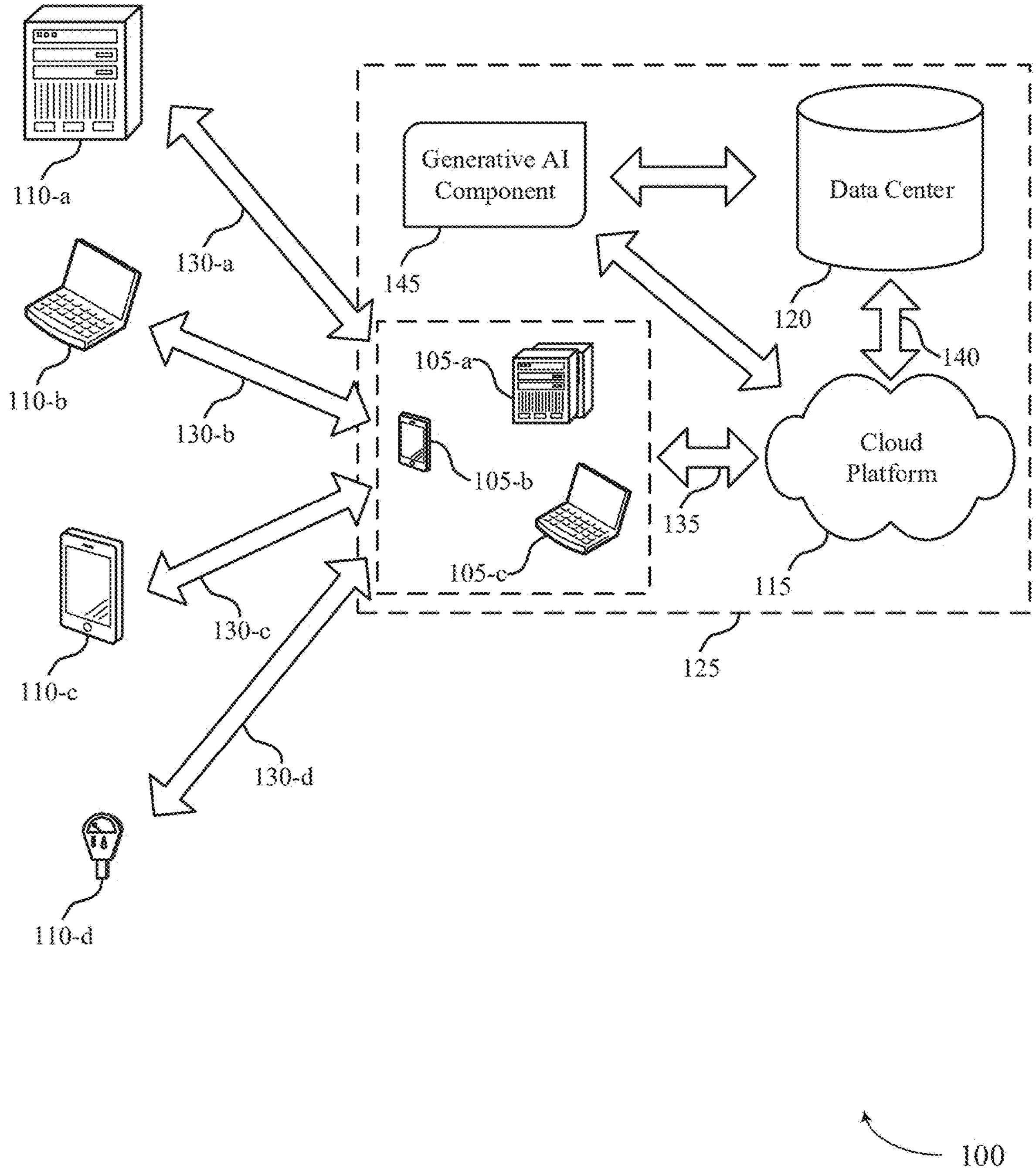
FIG. 1 illustrates an example of a system for cloud computing that supports contextual retrieval for multi-tenant retrieval-augmented generation (RAG) with adaptive learning in accordance with aspects of the present disclosure.

Some systems may use retrieval-augmented generation (RAG) to improve generative artificial intelligence (AI) results. For example, for a specific query to a large language model (LLM) or another AI component, a RAG pipeline may provide additional context to the LLM relevant to the query. A RAG process may involve a system retrieving one or more documents based on the query and including at least one retrieved document as an additional input to the LLM (e.g., in addition to the query, an LLM prompt, or both). However, in some cases, a retrieved document may introduce an error into the system. For example, the RAG process may retrieve a document that is irrelevant to the LLM or query, that includes misleading or false information, or that otherwise negatively affects a resulting output of the LLM. For example, such a document may cause hallucinations at the LLM or may otherwise lead to an inaccurate result generated by the LLM in response to the query. Training the LLM to account for such errors may involve a significant processing overhead (e.g., based on a quantity of layers, weights, or both at the LLM) or may be unsupported (e.g., if the LLM is an off-the-shelf LLM or is otherwise owned or operated by a different entity).

To improve the contextual retrieval of a RAG process, a system may implement a context-based embedding function in the RAG process. The system may adaptively train the context-based embedding function to reduce errors and improve document retrieval for a specific context (e.g., a specific LLM or a specific tenant of a multi-tenant database system). The system may implement the context-based embedding function on top of an otherwise unchanged RAG pipeline to improve document retrieval for an LLM. The context-based embedding function may project document vectors from a generic vector space into a context-based vector space for document retrieval. The system may receive a query for the LLM and may retrieve a document using the context-based vector space and a search vector representing the query. The retrieved document may provide additional contextual information to the LLM to improve the LLM's output.

The system may adaptively train the context-based embedding function based on the LLM, user feedback, or both. For example, the system may train the context-based embedding function to improve alignment of document retrieval likelihoods with confidence metrics for the outputs of the LLM. The LLM may output a result in response to a query, a prompt, and one or more documents retrieved via the RAG process. The LLM may additionally output a confidence metric indicating how confident the LLM is in the accuracy of the output result. A relatively more relevant document retrieved by the RAG process may be more likely to result in a relatively higher confidence metric at the LLM, and a relatively less relevant document retrieved by the RAG process may be more likely to result in a relatively lower confidence metric at the LLM. The system may use the confidence metrics to train the context-based embedding function, such that the context-based embedding function improves the likelihood of retrieving documents that result in relatively higher LLM confidence metrics and reduces the likelihood of retrieving documents that result in relatively lower LLM confidence metrics. Accordingly, the system may adaptively train the context-based embedding function without labeled training data (e.g., indicating ground truths), user feedback, or both. In some examples, the system may supplement such training with further training based on user feedback (e.g., user feedback indicating accuracies of LLM results). By training the context-based embedding function—and refraining from modifying model weights of the LLM, a generic document embedding function of the RAG process, or both—the system may reduce a processing overhead associated with improving the contextual retrieval and may improve the robustness of the system (e.g., reducing error propagation, reducing LLM hallucinations, supporting plug-and-play LLMs and RAG pipelines, or any combination thereof).

Aspects of the disclosure are initially described in the context of systems supporting RAG functionality for LLMs. Additional aspects of the disclosure are described with reference to a RAG pipeline, a context-based training process, and a process flow. Aspects of the disclosure are further illustrated by and described with reference to apparatus diagrams, system diagrams, and flowcharts that relate to contextual retrieval for multi-tenant RAG with adaptive learning.

FIG. 1 illustrates an example of a system 100 for cloud computing that supports contextual retrieval for multi-tenant RAG with adaptive learning in accordance with aspects of the present disclosure. The system 100 includes cloud clients 105, contacts 110, a cloud platform 115, and a data center 120. The cloud platform 115 may be an example of a public or private cloud network. A cloud client 105 may access the cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user who is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access the cloud platform 115 to store, manage, and process the data associated with the interactions 130. In some cases, the cloud client 105 may have an associated security or permission level. A cloud client 105 may have access to specific applications, data, and database information within the cloud platform 115 based on the associated security or permission level and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

The cloud platform 115 may offer an on-demand database service to the cloud client 105. In some cases, the cloud platform 115 may be an example of a multi-tenant database system. In some such cases, the cloud platform 115 may serve multiple cloud clients 105 with a single instance of software. However, other types of systems may be implemented, including—but not limited to—client-server systems, mobile device systems, and mobile network systems. In some cases, the cloud platform 115 may support CRM solutions. This may include support for sales, service, marketing, community, analytics, applications, and the Internet of Things. The cloud platform 115 may receive data associated with contact interactions 130 from the cloud client 105 via a network connection 135 and may store and analyze the data. In some cases, the cloud platform 115 may receive data directly from an interaction 130 between a contact 110 and the cloud client 105. In some cases, the cloud client 105 may develop applications to run on the cloud platform 115. The cloud platform 115 may be implemented using remote servers. In some cases, the remote servers may be located at one or more data centers 120.

A data center 120 may include multiple servers. The multiple servers may be used for data storage, management, and processing. The data center 120 may receive data from the cloud platform 115 via a connection 140, or directly from the cloud client 105 or an interaction 130 between a contact 110 and the cloud client 105. The data center 120 may utilize multiple redundancies for security purposes. In some cases, the data stored at the data center 120 may be backed up by copies of the data at a different data center (not pictured).

A subsystem 125 may include cloud clients 105, the cloud platform 115, and the data center 120. In some cases, data processing may occur at any of the components of the subsystem 125, or at a combination of these components. In some cases, servers may perform the data processing. The servers may be a cloud client 105 or located at the data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some examples, the system 100 may include a generative artificial intelligence (AI) component 145. The generative AI component 145 may be an example or a component of a large language model (LLM), such as a generative AI model. In some examples, the generative AI component 145 may additionally, or alternatively, be referred to as any of an AI, a generative AI (GAI), a GAI model, an LLM, a machine learning model, or any similar terminology. The generative AI component 145 may be a model that is trained on a corpus of input data, which may include text, images, video, audio, structured data, or any combination thereof. Such data may represent general-purpose data, domain-specific data, or any combination thereof. Further, the generative AI component 145 may be supplemented with additional training on data associated with a role, function, or generation outcome to further specialize the generative AI component 145 and increase the accuracy and relevance of information generated with the generative AI component 145.

In some examples, the cloud platform 115 may receive a query from a cloud client 105 that may include a request to produce a response (e.g., text, images, video, audio, or other information) to the query using the generative AI component 145. The cloud platform 115 may input a prompt to the generative AI component 145 that includes, or otherwise indicates, the query (or information included therein). The generative AI component 145 may generate an output (e.g., text, images, video, audio, or other information) that is responsive to the prompt. In some examples, the cloud platform 115 may modify or supplement one or more aspects of the query to increase the quality of the response. In some examples, such modification or supplementation may be referred to as grounding.

The system 100 may support any configuration for the use of generative AI models. In FIG. 1, the generative AI component 145 is depicted as being located external to the subsystem 125. However, the generative AI component 145 may be hosted on the cloud platform 115, elsewhere within the subsystem 125, or outside the subsystem 125 (e.g., a publicly-hosted platform). Additionally, or alternatively, multiple generative AI components 145 may be employed to perform one or more of the actions described as being performed by a single generative AI component 145. Further, in some examples, the generative AI component 145 may communicate with one or more other elements, such as a contact 110, the data center 120, one or more other elements, or any combination thereof, to receive additional information (e.g., that may be indicated in the query or the prompt) that is to be considered for performing generative processes.

In various implementations, the models and/or modules described herein (e.g., including, but not limited to, the generative AI component 145) may be classification, predictive, generative, conversational, or another form of AI technology, such as AI model(s), agents, etc., implementing one or more forms of machine learning, a neural network, statistical modeling, deep learning, automation, natural language processing, or other similar technology. The AI technology may be included as part of a network or system comprising a hardware- or software-based framework for training, processing, fine-tuning, or performing any other implementation steps. Furthermore, the AI technology may include a hardware- or software-based framework that performs one or more functions, such as retrieving, generating, accessing, transmitting, etc. The AI technology may be implemented by a computer including a register coupled with a processor or a central processing unit (CPU).

Moreover, the AI technology may be trained or fine-tuned using supervised, unsupervised, or other AI training techniques. In various implementations, the AI technology may be trained or fine-tuned using a set of general datasets or a set of datasets directed to a particular field or task. Additionally, or alternatively, the AI technology may be intermittently updated at a set interval or in real time based on resulting output or additional data to further train the AI technology. The AI technology may offer a variety of capabilities including text, audio, image, and other content generation, translation, summarization, classification, prediction, recommendation, time-series forecasting, searching, matching, pairing, and more. These capabilities may be provided in the form of output produced by the AI technology in response to a particular prompt or other input. Furthermore, the AI technology may implement Retrieval-Augmented Generation (RAG) or other techniques after training or fine-tuning by accessing a set of documents or knowledge base directed to a particular field or website other than the training or fine-tuning data to influence the AI technology's output with the set of documents or knowledge base.

To further guide and train output of the AI technology, one or more input prompts may be provided to the AI technology for the purpose of eliciting particular responses. In various implementations, the input prompts may correspond to the particular field or task to which the AI technology is trained. Additionally, or alternatively, the AI technology may be implemented along with one or more additional AI technologies. For example, a first AI model may produce a first output, which is used as input for a second AI model to produce a second output. These AI technologies may be used in succession of one another, in parallel with another, or a combination of both. Furthermore, the AI technologies may be merged in a variety of implementations, for example, by bagging, boosting, stacking, etc. the AI technologies.

Some other systems may implement a RAG pipeline to provide contextual information (e.g., relevant documents) to an AI model. The RAG pipeline may retrieve one or more documents based on a query for the AI model (e.g., an LLM). However, such a RAG pipeline may potentially introduce errors into the AI process that propagate to the LLM. For example, if an error occurs during document retrieval (e.g., the retrieved documents are imprecise or irrelevant), this error in the RAG pipeline may be propagated to the LLM based on providing such imprecise or irrelevant documents as context for the LLM's generation. In some cases, imprecise or irrelevant documents may cause the LLM to hallucinate (e.g., outputting results that, while coherent and grammatically correct, may be false or otherwise misleading). Accordingly, in some examples, RAG may reduce the accuracy of LLM results.

However, in such other systems, the RAG pipeline, the LLM, or both may be static components in the AI process. For example, the RAG pipeline may use a generic document embedding procedure, a generic vector search in the document space, or both. Additionally, or alternatively, the LLM may be an off-the-shelf LLM or may otherwise be controlled by a separate system, entity, or organization (e.g., a publicly-available LLM). In such systems, a user, tenant, or organization using the AI process may be restricted from accessing details of the RAG pipeline, the LLM weights, or both. Accordingly, the RAG pipeline, the LLM, or both may fail to support fine-tuning or other improvements to fix document retrieval errors or error propagation. Additionally, or alternatively, the user, tenant, or organization may not have access to user data (e.g., labeled data for supervised learning, ground truths for correct document retrieval, user feedback about the quality of the LLM results) for training the RAG pipeline, the LLM, or both. Accordingly, the user, tenant, or organization may fail to identify if errors are occurring in the AI process, the source of such errors, or both.

In contrast, the system 100 may implement a context-based embedding function that interfaces with a RAG pipeline to adaptively improve the document retrieval process. The context-based embedding function may support contextual retrieval of documents for RAG operations to improve a generative AI component 145. The context-based embedding function (e.g., a "contriever," a "transtreiver") may operate as a filter to reduce (e.g., minimize) errors passed from the RAG pipeline to an LLM. Because the context-based embedding function is an example of a component added on top of the RAG pipeline, the context-based embedding function may refrain from modifying a document embedding procedure for the RAG pipeline, a vector search in the RAG pipeline, weights or the LLM, or any combination thereof. Accordingly, the system 100 may improve document retrieval for a generic RAG pipeline with an off-the-shelf LLM.

The context-based embedding function may project the generic document embeddings of the RAG pipeline (e.g., from a generic vector space) into a context-specific vector space for document retrieval. The context-specific vector space may correspond to the specific LLM, a specific tenant of a multi-tenant system, or any other specific context for document retrieval. The RAG pipeline may search for relevant documents in the context-specific vector space rather than the generic vector space. The system 100 may adapt the context-based embedding function based on confidence metrics of the LLM. For example, the system 100 may use the documents retrieved from the context-specific vector space as contextual inputs to the LLM. The LLM may output results and corresponding confidence metrics indicating levels to which the LLM is confident in the results. Absent user feedback (or in addition to user feedback) indicating whether the results are accurate and relevant, the system 100 may use the confidence metrics to predict whether the results are accurate and relevant. For example, relatively higher confidence from the LLM corresponds to a relatively higher likelihood that the corresponding result is accurate and relevant. The system 100 may feedback information to the context-based embedding function indicating which retrieved documents resulted in relatively more confident LLM results or relatively less confident LLM results. The system 100 may train—or otherwise fine-tune—the context-based embedding function (e.g., without changing the RAG pipeline or LLM) to improve the likelihood of retrieving documents that lead to relatively confident LLM results. The system 100 may personalize the document retrieval process over time for the specific LLM or tenant to reduce document retrieval errors and error propagation to the LLM, improving the functionality of the LLM. Additionally, or alternatively, by fine-tuning the context-based embedding function rather than the LLM weights (which may include a relatively large quantity of layers and weights), the system 100 may reduce a processing overhead associated with improving the AI process. In some examples, the context-based embedding function may improve the flexibility of the system 100 by allowing the system 100 to change the specific LLM or RAG pipeline used for the AI process without affecting the adaptively-learned contextual information of the context-based embedding function. Therefore, the improved document retrieval provided by the context-based embedding function may be resilient to changes to the underlying RAG pipelines or LLMs controlled by other entities (e.g., publicly-available LLMs).

It should be appreciated by a person skilled in the art that one or more aspects of the disclosure may be implemented in a system 100 to additionally, or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
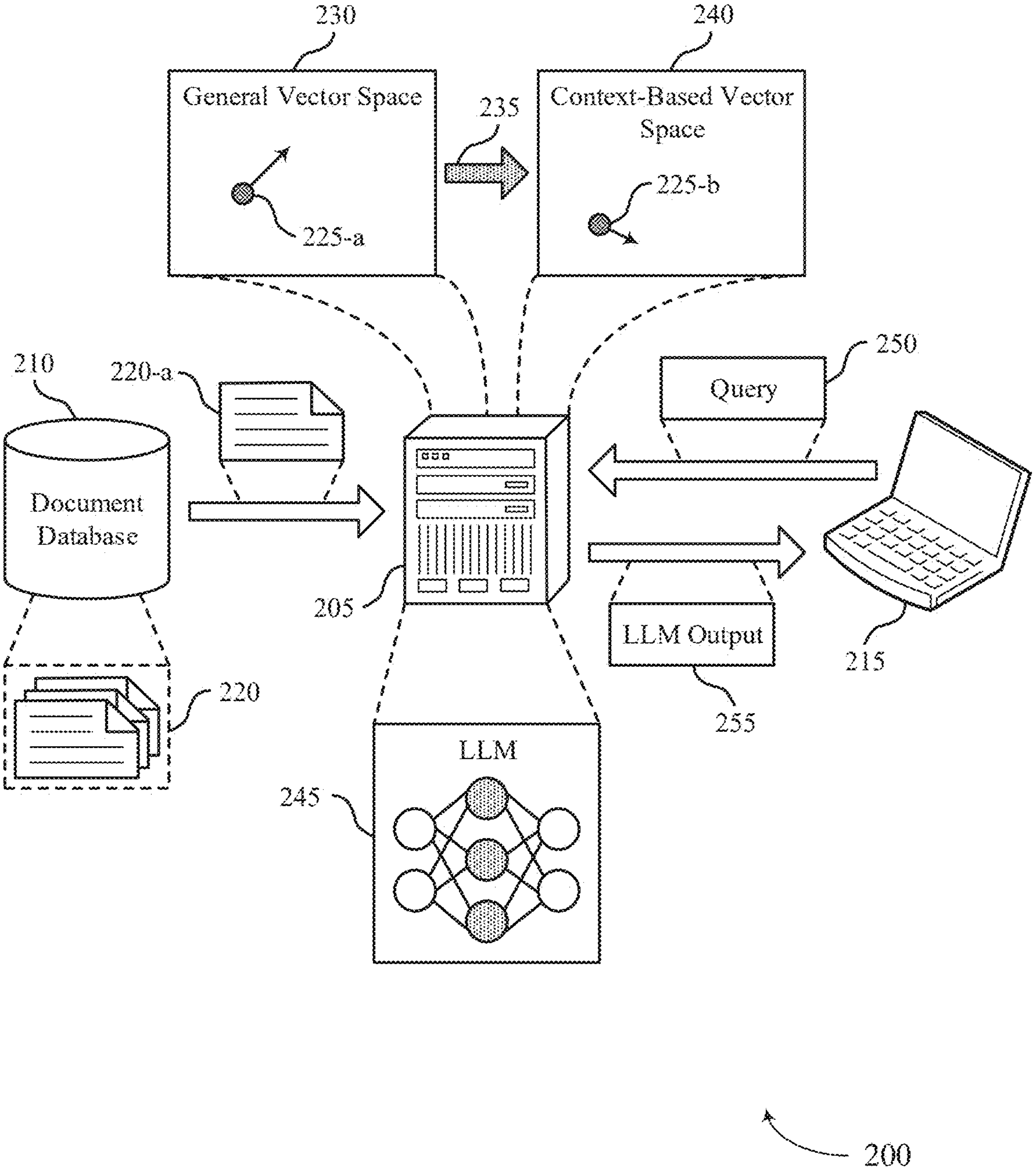
FIG. 2 shows an example of a system that supports contextual retrieval for multi-tenant RAG with adaptive learning in accordance with aspects of the present disclosure.

FIG. 2 shows an example of a system 200 that supports contextual retrieval for multi-tenant RAG with adaptive learning in accordance with aspects of the present disclosure. The system 200 may include a processing device 205, a document database 210, and a user device 215. The processing device 205 may be a component of a system 100 (e.g., a component of a cloud platform 115), the document database 210 may be an example or component of a data center 120 or a cloud platform 115, and the user device 215 may be an example of a cloud client 105 or a contact 110, as described with reference to FIG. 1. For example, the processing device 205 may be an example of a single component, a single device, or a system of devices, such as an application server, a database server, a cloud-based server or service, a worker server, a server cluster, a virtual machine, a container, a network device, a user device, or any combination of these or other computing devices. The document database 210 may be an example of a database, a data repository, or any other data source providing a set of documents. The user device 215 may be an example of a smartphone, a laptop, a desktop, a smartwatch, or any other device that supports inputs and outputs for a user operating the device. The system 200 may support context-based RAG to improve results of an LLM 245.

The processing device 205 (or the user device 215) may host the LLM 245. The LLM 245 may be an example of a generative AI component 145 as described with reference to FIG. 1. For example, the LLM 245 may be any machine learning or AI component that uses RAG to improve an LLM output 255 of the LLM 245. In some examples, the LLM 245 may be referred to as a "generator" that supports generative AI. The LLM 245 may receive a query 250 and one or more documents 220 as inputs (e.g., with, or as parts of, a prompt) and may output an LLM output 255 responding to the query 250. In some examples, a user may input the query 250 to a user device 215, and the LLM output 255 may be sent for display via a user interface of the user device 215.

The processing device 205 may perform RAG using a document database 210. The document database 210 may store a set of documents 220 for retrieval. In some examples, the document database 210 may be an example of any type of data source. For example, the processing device 205 may retrieve the set of documents 220 from a database or data store, from an online corpus of documents (e.g., via the Internet), from social media or communication data (e.g., via an email or social media application), from a server, via a data mining process, via a web scraping process, or any combination thereof. The documents 220 may be any sort of data providing contextual information to the LLM 245. For example, the documents 220 may include text-based documents, communications (e.g., texts, emails, posts, voice messages, transcripts), image-based documents, data from a CRM system, or any combination thereof.

The processing device 205 may embed the set of documents 220 into a first vector space, which may be an example of a general vector space 230. For example, the processing device 205 may use an off-the-shelf, or otherwise generic, document embedding function to embed the documents 220 into the general vector space 230. Accordingly, the general vector space 230 may be context-agnostic, such that the vectors of the general vector space 230 are unassociated with any specific LLM 245, tenant, organization, or any combination thereof. For example, the processing device 205 may retrieve a first document 220-*a* from the document database 210 and may embed the first document 220-*a* as a first vector 225-*a* in the general vector space 230. The first vector 225-*a* may be a vector of any quantity of dimensions in accordance with the document embedding function.

The processing device 205 may project the vectors of the general vector space 230 into a context-based vector space 240 (e.g., a second vector space) using a context-based embedding function 235. The context-based embedding function 235 and, accordingly, the context-based vector space 240 may be specific to an LLM 245, a tenant, an organization, or any combination thereof. The processing device 205 may train the context-based embedding function 235 to improve the results of the LLM 245. The context-based embedding function 235 may shift the vectors from the general vector space 230 into different vectors in the context-based vector space 240. For example, the context-based embedding function 235 may project the first vector 225-*a* from the general vector space 230 into a second vector 225-*b* in the context-based vector space 240. The second vector 225-*b* may have the same or different dimensions as the first vector 225-*a*. Both the first vector 225-*a* and the second vector 225-*b* may be representations of the document 220-*a*.

The processing device 205 may use the context-based vector space 240 for RAG processes. For example, the processing device 205 may receive a query 250 (e.g., from a user device 215) for the LLM 245. The processing device 205 may search the context-based vector space 240 for one or more documents 220 relevant to the query 250. In some examples, the processing device 205 may determine a search vector for the query 250 (e.g., using a searching function, the context-based embedding function 235, or both). For example, the processing device 205 may vectorize the query 250, key terms of the query 250, or any other portion of the query 250 to generate the search vector representative of the query 250. The processing device 205 may search the context-based vector space 240 to identify relevant vectors. For example, the processing device 205 may determine, in the context-based vector space 240, a set of closest vectors to the search vector. In some examples, the processing device 205 may perform a vector search or vector similarity search for the search vector (e.g., using a Euclidean distance analysis, a cosine similarity, a dot product similarity, or any other similarity metric). The processing device 205 may determine one or more relevant vectors and may retrieve the corresponding documents 220 for inputting into the LLM 245. The retrieved documents 220 may provide additional knowledge, context, or both specifically relevant to the query 250 to improve results of the LLM 245.

The processing device 205 may input, into the LLM 245, values representative of a prompt for the LLM 245, the query 250, at least one of the retrieved documents 220, or any combination thereof. The LLM 245 may output, based on the inputs, an LLM output 255. Additionally, or alternatively, the LLM 245 may output a confidence metric indicating a confidence in the LLM output 255. The LLM 245 may send the LLM output 255, the confidence metric, or both for presentation at the user device 215. Additionally, the processing device 205 may use the confidence metric to train the context-based embedding function 235. For example, the processing device 205 may train the context-based embedding function 235 to improve the likelihood of retrieving documents 220 that result in relatively more confident outputs by the LLM 245 and reduce the likelihood of retrieving documents 220 that result in relatively less confident outputs by the LLM 245. Updating the context-based embedding function 235 may correspondingly update the context-based vector space 240. The resulting context-based embedding function 235 may be tuned to specifically improve the LLM 245, such that the RAG process using the context-based vector space 240 retrieves documents 220 in accordance with the context of the LLM 245.

Figure 3:
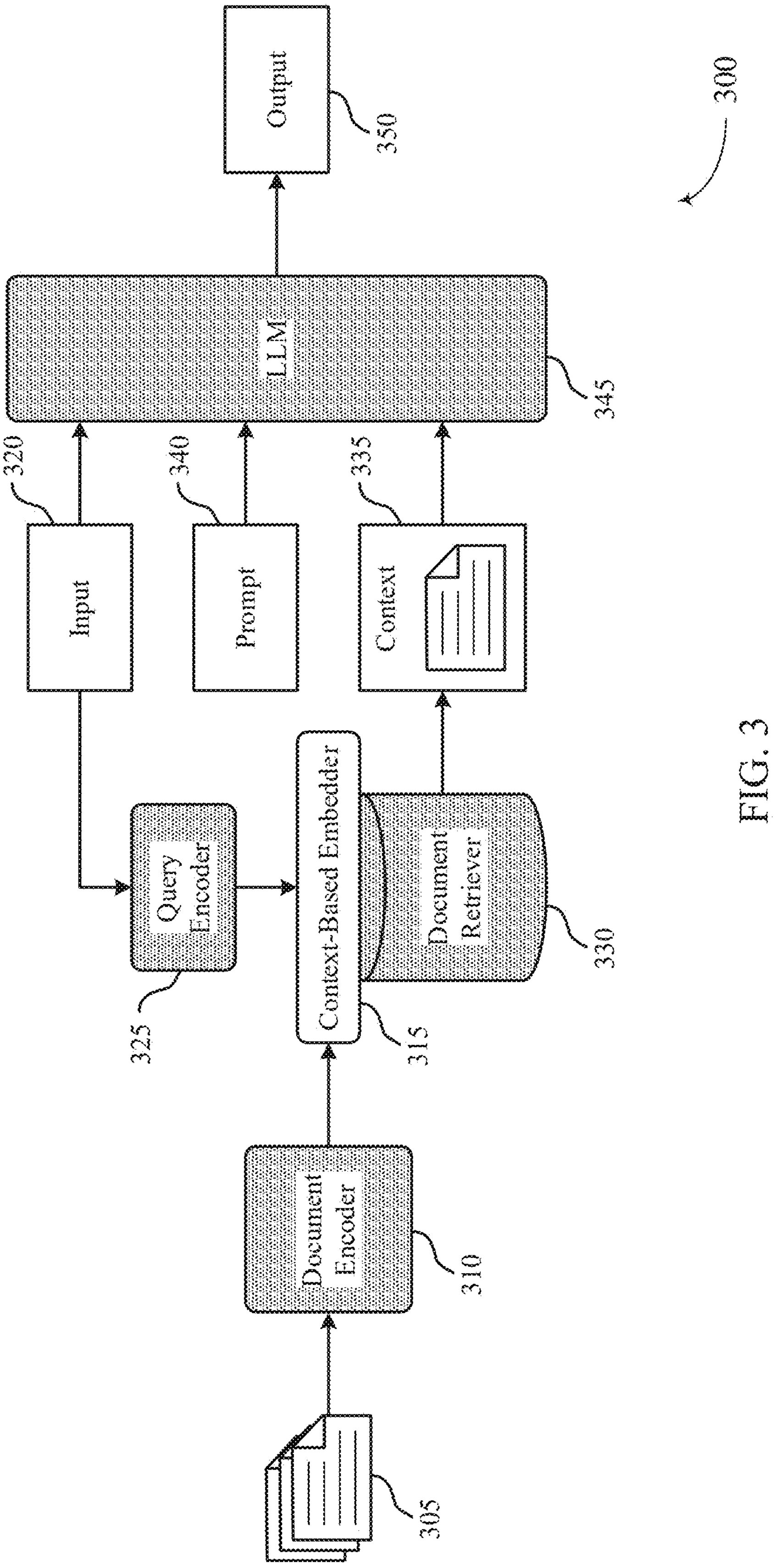
FIG. 3 shows an example of a RAG pipeline that supports contextual retrieval for multi-tenant RAG with adaptive learning in accordance with aspects of the present disclosure.

FIG. 3 shows an example of a RAG pipeline 300 that supports contextual retrieval for multi-tenant RAG with adaptive learning in accordance with aspects of the present disclosure. A system, such as a system 100 or a system 200 as described with reference to FIGS. 1 and 2, may implement the RAG pipeline 300. One or more processing devices, such as a processing device 205 as described with reference to FIG. 2, may perform aspects of the RAG pipeline 300. The RAG pipeline 300 may include an LLM 345, which may be an example of an LLM 245 as described with reference to FIG. 2. The RAG pipeline 300 may additionally include a context-based embedder 315, which may support a context-based embedding function 235 as described with reference to FIG. 2. The context-based embedder 315 may modify the RAG pipeline 300 to improve contextual retrieval of documents 305 to improve LLM results (e.g., an output 350).

The RAG pipeline 300 may vectorize the documents 305 using a document encoder 310. For example, the document encoder 310 may encode the documents 305 as vectors, or may otherwise embed the documents 305 as vectors in a general vector space. The context-based embedder 315 may shift—or otherwise project—the document encodings into a context-based vector space. In some examples, the context-based embedder 315 may be a feed forward or gated linear unit (GLU) projection. The RAG pipeline 300 may use this context-based vector space for document retrieval. For example, a document retriever 330 may retrieve relevant documents based on the vectors embedded in the context-based vector space.

If the LLM 345 receives an input 320 defining a query for the LLM 345, the RAG pipeline 300 may retrieve one or more documents relevant to the input 320. The RAG pipeline 300 may use a query encoder 325 to vectorize the input 320 (e.g., using a similar process as the document encoder 310). The context-based embedder 315 may shift—or otherwise project—the query encoding into the context-based vector space. The document retriever 330 may retrieve one or more documents providing context 335 for the LLM 345 based on the query encoding and the document encodings. For example, the document retriever 330 may retrieve documents corresponding to vectors (e.g., from the document encodings) that are relatively close to a search vector (e.g., the query encoding) within the context-based vector space.

The RAG pipeline 300 may improve the accuracy of the LLM 345 by providing the one or more documents providing context 335, in addition to a prompt 340 and the input 320, to the LLM 345 as inputs. The LLM 345 may determine (e.g., generate) an output 350 responsive to the prompt 340 (e.g., which may define a format for the output 350 or otherwise indicate the desired output 350), the input 320, the one or more documents providing context 335, or any combination thereof. The output 350 may answer a question (e.g., a query) provided in the input 320 using some knowledge (e.g., the documents providing context 335, which may be knowledge articles, messages, or any other contextual information).

The system 100 supporting the RAG pipeline 300 may train the context-based embedder 315 without modifying other aspects of the RAG pipeline 300. For example, the system 100 may refrain from modifying the document encoder 310, the query encoder 325, the document retriever 330, and the LLM 345. Instead, the system 100 may implement the context-based embedder 315 on top of the RAG pipeline 300 (e.g., an existing RAG pipeline). Accordingly, the RAG pipeline 300 may use a generic or off-the-shelf document encoder 310, query encoder 325, document retriever 330, LLM 345, or any combination thereof. The system 100 may robustly switch the document encoder 310, query encoder 325, document retriever 330, LLM 345, or any combination thereof used for the RAG pipeline 300 based on training the context-based embedder 315 without modifying the corresponding document encoder 310, query encoder 325, document retriever 330, or LLM 345.

Figure 4:
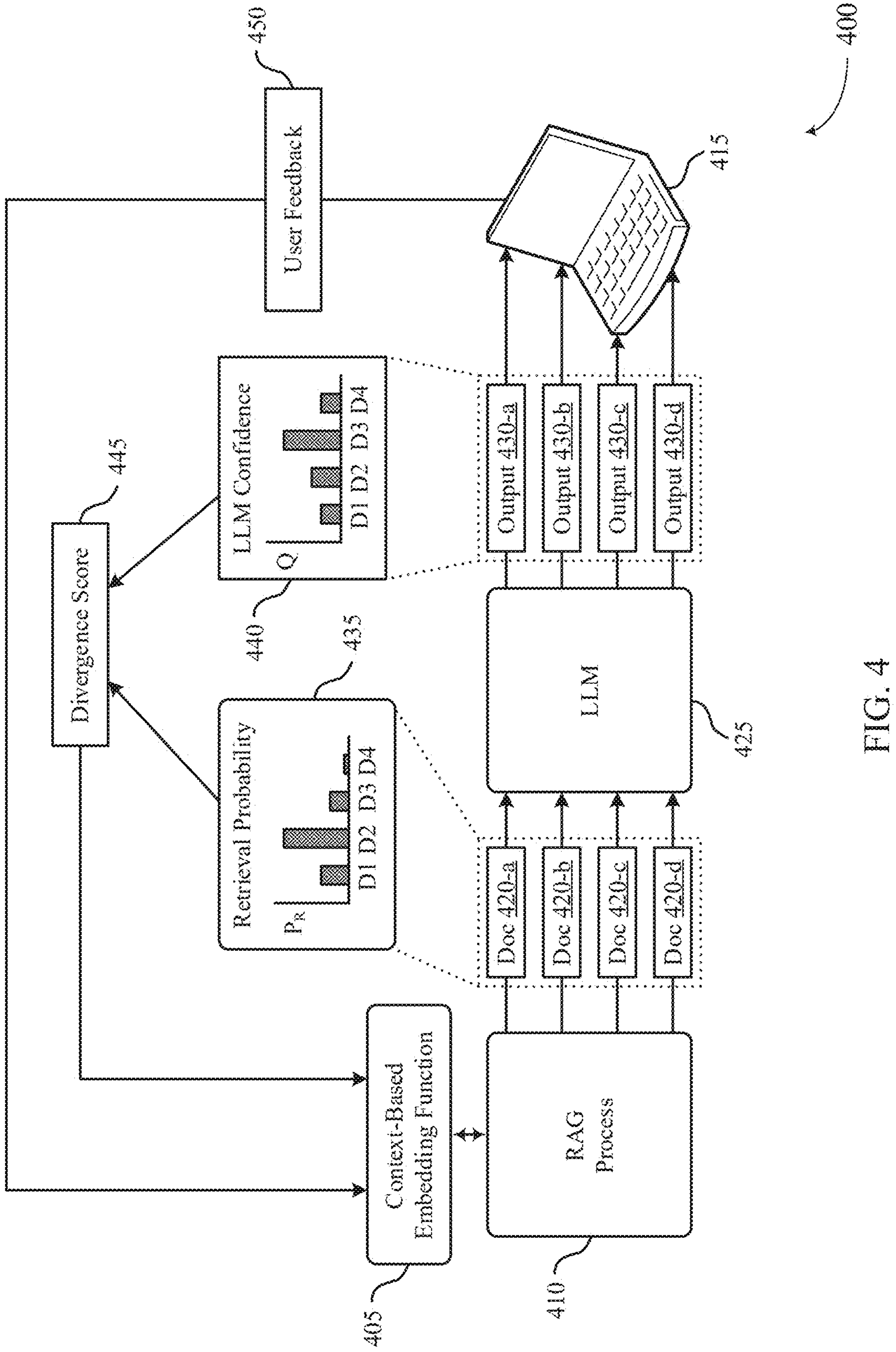
FIG. 4 shows an example of a context-based training process that supports contextual retrieval for multi-tenant RAG with adaptive learning in accordance with aspects of the present disclosure.

FIG. 4 shows an example of a context-based training process 400 that supports contextual retrieval for multi-tenant RAG with adaptive learning in accordance with aspects of the present disclosure. A system, such as a system 100 or a system 200 as described with reference to FIGS. 1 and 2, may implement the context-based training process 400 to train a context-based embedding function 405, such as a context-based embedding function 235 or a context-based embedder 315 as described with reference to FIGS. 2 and 3. For example, one or more processing devices, such as a processing device 205 as described with reference to FIG. 2, may perform the context-based training process 400. The context-based training process 400 may be specific to an LLM 425, such as a generative AI component 145, an LLM 245, or an LLM 345 as described with reference to FIGS. 1-3. Additionally, or alternatively, the context-based training process 400 may be specific to a tenant or organization of a multi-tenant system. The context-based training process 400 may learn the context-based embedding function 405 (e.g., a "contriever" network) in an online fashion.

The context-based training process 400 may improve contextual retrieval for a RAG system. RAG systems may include "upstream" components and "downstream" components, where the upstream components may prepare information (e.g., retrieve documents) for use by the downstream components. In some examples, upstream components may be relatively lightweight or unsophisticated (e.g., including an embedder, a top k document retriever), while downstream components may include relatively powerful language models (e.g., supporting dialogue turn generation or summarization) with significant processing overhead. A RAG process 410 may be an example of an upstream component, and an LLM 425 may be an example of a downstream component. Some systems may use static components, such that the upstream components are independent of the downstream components. Such systems may be susceptible to error propagation from the upstream components to the downstream components.

In contrast, the context-based training process 400 may enable the backflow of information from downstream components to improve upstream components. For example, the system may personalize upstream components (e.g., the context-based embedding function 405 implemented with the RAG process 410) to the specific downstream language model (e.g., the LLM 425) to prevent, mitigate, or reduce error propagation from the document retrieval stage. Such training may ensure the system is robust to hallucinations, improve the relevance of retrieved documents, and improve other quality metrics for the LLM 425. As an example, the system may integrate signals from a downstream language model (e.g., the LLM 425), user feedback 450, or both to update (e.g., continuously update and refine) an upstream component (e.g., the context-based embedding function 405). The context-based training process 400 may train contextual retrieval without access to labeled or annotated data, effectively personalizing the RAG process 410 without using expert feedback or ground truth labeling for relevant documents corresponding to search queries. Additionally, the context-based training process 400 may train the contextual retrieval without modifying model weights of the RAG process 410 or the LLM 425, supporting improvements even if weights of language models, embedding models, or both are inaccessible (or otherwise secured or fixed). The training may result in a context-based embedding function 405 that is "plug-and-play," such that it can be applied to systems using off-the-shelf vendor models, existing or new RAG pipelines, or both without changes to the context-based embedding function 405. Additionally, or alternatively, the context-based embedding function 405 may be a relatively simple embedder or vector projection model (e.g., with a size on the scale of one or more Megabytes), such that the context-based embedding function 405 may be hosted within a tenant-specific namespace without additional graphics processing unit (GPU) requirements or latency overheads.

The RAG process 410 may use the context-based embedding function 405 and an embedder to embed one or more queries x and one or more documents d in a vector space (e.g., a context-specific vector space). The RAG process 410 may retrieve i candidate documents $d_i$ based on their similarity to x. For example, the RAG process 410 may send a first candidate document 420-*a*, a second candidate document 420-*b*, a third candidate document 420-*c*, and a fourth candidate document 420-*d* to the LLM 425 as retrieved contextual information. The context-based training process 400 may compute retrieval probabilities 435 for the retrieved candidate documents based on the RAG process 410. The retrieval probabilities 435 (e.g., $P_R(d_i|x)$) may indicate a retrieval likelihood for each candidate document $d_i$. In some examples, the retrieval probabilities 435 may be based on the RAG process 410 with the context-based embedding function 405. For example (e.g., for a specific query to the LLM 425), the RAG process 410 may be 20% likely to retrieve the first candidate document 420-*a*, 35% likely to retrieve the second candidate document 420-*b*, 15% likely to retrieve the third candidate document 420-*c*, and 10% likely to retrieve the fourth candidate document 420-*d*. In some cases, the RAG process 410 may have other probabilities of retrieving other documents. However, documents $d_1$, $d_2$, $d_3$, and $d_4$ may be the relatively most-likely candidate documents to retrieve. The retrieval probabilities 435 may be further based on the search function used by the RAG process 410 for document retrieval.

The system may input the retrieved candidate documents as contextual information with the query for the LLM 425. For example, the LLM 425 may generate a first output 430-*a* in response to the query, a prompt, and the first candidate document 420-*a*. Similarly, the LLM 425 may generate a second output 430-*b* in response to the query, the prompt, and the second candidate document 420-*b*; a third output 430-*c* in response to the query, the prompt, and the third candidate document 420-*c*; and a fourth output 430-*d* in response to the query, the prompt, and the fourth candidate document 420-*d*. The LLM 425 may send one or more of the generated outputs to a user device 415 for presentation. In some examples, the outputs may be sent to the user device 415 in response to receiving the query from the user device 415.

The LLM 425 may additionally compute LLM confidence metrics 440 for the LLM outputs. An LLM confidence metric may predict a likelihood that a respective output of the LLM 425 is correct. The system may compute an LLM confidence metric Q that a result y is correct for a query x based on contextual information from a candidate document $d_i$. The system may determine $Q(d_i|x, y)$ based on a perplexity score $P_{LLM}(y|d_i, x)$ for the LLM 425. For example, the system may determine an LLM confidence of 40% in the first output 430-*a* based on the first candidate document 420-*a*, an LLM confidence of 50% in the second output 430-*b* based on the second candidate document 420-*b*, an LLM confidence of 80% in the third output 430-*c* based on the third candidate document 420-*c*, and an LLM confidence of 40% in the fourth output 430-*d* based on the fourth candidate document 420-*d*.

The system may compute a divergence score 445 between the retrieval probabilities 435 and the LLM confidence metrics 440. In some examples, the system may compute a Kullback-Leibler (KL) divergence $KL(P_R||Q)$ for the retrieval probabilities 435, $P_R$, and the LLM confidence metrics 440, Q. The system may train the context-based embedding function 405 based on the divergence score 445. For example, the system may tune model parameters of the context-based embedding function 405 to reduce—or otherwise minimize—the divergence score 445, L, where L is defined by Equation (1).

$$L = \frac{1}{|B|}\sum_{x \in B} KL(P_R(d \mid x) \| Q_{LLM}(d \mid x, y)) \tag{1}$$

Tuning the model parameters may involve an online learning formula for the context-based embedding function 405 to modify the ranking function of the RAG process 410 with the context-based embedding function 405. In some examples, the online learning formula may update the ranking function R with a learning rate η in accordance with Equation (2).

$$R_{t+1}(q, d) = R_t(q, d) + \eta \cdot \nabla R_t \tag{2}$$

Tuning the model parameters to reduce the divergence score 445 may effectively align the retrieval probabilities 435 with the LLM confidence metrics 440. A relatively low LLM confidence metric may implicitly indicate that the corresponding candidate document may be irrelevant, misleading, or otherwise provide relatively poor context. In contrast, a relatively high LLM confidence metric may implicitly indicate that the corresponding candidate document may be relevant or otherwise provide helpful context to the LLM 425. Aligning the retrieval probabilities 435 with the LLM confidence metrics 440 may improve the likelihood of the RAG process 410 retrieving documents that are likely to be relevant and reduce the likelihood of the RAG process 410 retrieving documents that are likely to be irrelevant. Accordingly, the context-based training process 400 may improve the contextual retrieval for the LLM 425 based on the retrieval probabilities 435 and the LLM confidence metrics 440.

Additionally, or alternatively, a user operating the user device 415 may provide user feedback 450 to the LLM results. The context-based training process 400 may further train the context-based embedding function 405 based on the user feedback 450 (e.g., using logistic regression, XGBoost, or other feedback methods). For example, the user may provide user feedback 450 indicating whether a respective output of the LLM 425 is correct or accurate. The system may train the context-based embedding function 405, for example, based on rewarding a loss function according to the user feedback 450. Training the context-based embedding function 405 based on the user feedback 450 may improve the likelihood of the RAG process 410 retrieving documents that result in correct outputs (as indicated by the user) and may reduce the likelihood of the RAG process 410 retrieving documents that result in incorrect outputs (as indicated by the user). In some examples, Equation (3) may define a loss function enhancing model refinement including the user feedback 450, with weights α and β weighting divergence-based training with user feedback-based training.

$$L_{fdbk} = \frac{1}{|B|}\sum_{x\in B}(\alpha\cdot KL(P_R(d\,|\,x)\|Q_{LLM}(d\,|\,x,\ y)) + \beta\cdot L_{user}(d,x)) \tag{3}$$

As an example, a prompt to the LLM 425 may request an evaluation of two summaries of an article. The query to the LLM 425 may indicate the two possible summaries. The RAG process 410, with the context-based embedding function 405, may retrieve a relevant article (e.g., document). The LLM 425 may evaluate the possible summaries and provide a properly formatted response even if the retrieved article is not relevant to the summaries. However, the corresponding LLM confidence metric may be relatively low (e.g., below 60% or some other threshold). In contrast, the LLM 425 may evaluate the possible summaries and provide a properly formatted, accurate response if the retrieved article is relevant to the summaries, and the LLM 425 may indicate a relatively high LLM confidence metric for the result. The context-based training process 400 may improve the likelihood that the system retrieves the relevant document by adaptively improving the context-based embedding function 405.

Figure 5:
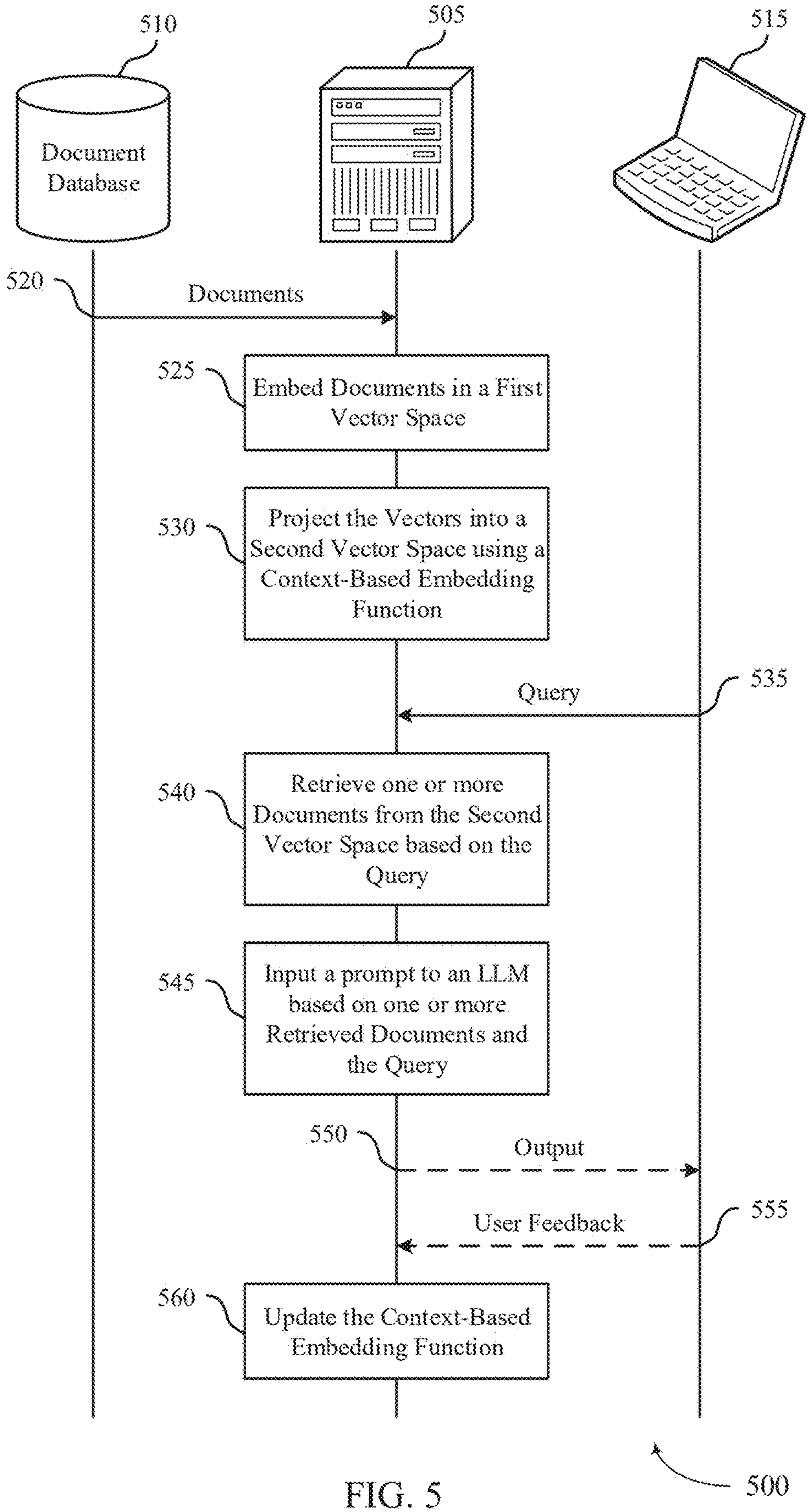
FIG. 5 shows an example of a process flow that supports contextual retrieval for multi-tenant RAG with adaptive learning in accordance with aspects of the present disclosure.

FIG. 5 shows an example of a process flow 500 that supports contextual retrieval for multi-tenant RAG with adaptive learning in accordance with aspects of the present disclosure. The process flow 500 may be implemented by a system including one or more processing devices 505, one or more document databases 510, one or more user devices 515, or any combination thereof. The system may be an example of a system 100 or a system 200 as described with reference to FIGS. 1 and 2. A processing device 505 may be an example of a computing device, an application server, a database server, a cloud-based server or service, a worker server, a server cluster, a virtual machine, a container, a network device, a user device, or any combination of these or other computing devices or systems. The document database 510 may be an example of a database, a data repository, or any other data source providing a set of documents. The user device 515 may be an example of a smartphone, a laptop, a desktop, a smartwatch, or any other device that supports inputs and outputs for a user operating the device. The user device 515 may include a user interface that can present information (e.g., visually, audibly) corresponding to LLM operations. Alternative examples of the following may be implemented, where some processes are performed in a different order than described or are not performed at all. In some examples, processes may include additional features not mentioned below, or further processes may be added. Additionally, or alternatively, one or more operations described herein as performed by the processing device 505 may instead be performed by the user device 515 (e.g., locally).

At 520, the processing device 505 may retrieve a set of documents from the document database 510. The set of documents may represent contextual information for an LLM (e.g., any AI or machine learning model). At 525, the processing device 505 may embed the set of documents as a first set of vectors in a first vector space (e.g., a general vector space) based on a document embedding function.

At 530, the processing device 505 may project the first set of vectors embedded in the first vectors space into a second set of vectors embedded in a second vector space (e.g., a context-based vector space) based on a context-based embedding function. For example, a first vector of the first set of vectors may correspond to a second vector of the second set of vectors. The first vector and the second vector may represent the same document from the set of documents. The context-based embedding function may be specific to the LLM, a tenant of a multi-tenant database system, or both. In some examples, the context-based embedding function may be an example of an AI model, such as a one-layer artificial neural network.

At 535, the processing device 505 may receive a query to the LLM from a user device 515. The processing device 505 may convert the query into a search vector for the second vector space (e.g., the context-based vector space). At 540, the processing device 505 may retrieve one or more documents of the set of documents based on the query and the second set of vectors embedded in the second vector space. For example, the processing device 505 may select one or more vectors of the second set of vectors based on a proximity of the search vector to the one or more vectors in the second vector space. The processing device 505 may retrieve documents corresponding to the one or more selected vectors.

At 545, the processing device 505 may input, to the LLM, a prompt, at least one document of the one or more retrieved documents, and at least a portion of the query. Inputting such information to the LLM may involve inputting values (e.g., vectors, bits, or other values) representative of this information. In response to the inputs, the LLM may output a result based on the prompt, the at least one document, and at least the portion of the query. Additionally, the LLM may output a confidence metric associated with the result.

In some examples, at 550, the processing device 505 may send the result to the user device 515 for display (e.g., in response to the query). In some cases, at 555, a user operating the user device 515 may provide feedback based on the result. The processing device 505 may receive the user feedback from the user device 515. In some examples, the user feedback may indicate an accuracy of the result. Additionally, or alternatively, the user feedback may indicate a relevance of the at least one document used as context for the LLM (e.g., if the processing device 505 surfaces the document to the user device 515 for review).

At 560, the processing device 505 may update the context-based embedding function based on the at least one document used as context for the LLM and the confidence metric associated with the result. In some cases, the processing device 505 may determine respective retrieval likelihoods for the one or more documents based on the context-based embedding function and may update the context-based embedding function to better align the respective retrieval likelihoods for the one or more documents with the respective confidence metrics for results output based on the one or more documents. Additionally, or alternatively, the processing device 505 may update the context-based embedding function based on the user feedback. The processing device 505 may refrain from updating the LLM (e.g., weights of the LLM), the document embedding function (e.g., for embedding documents in the first, general vector space), or both. The processing device 505 may use the updated context-based embedding function for document embedding in the second vector space, such that RAG is performed for future queries in accordance with the updated context-based embedding function.

Figure 6:
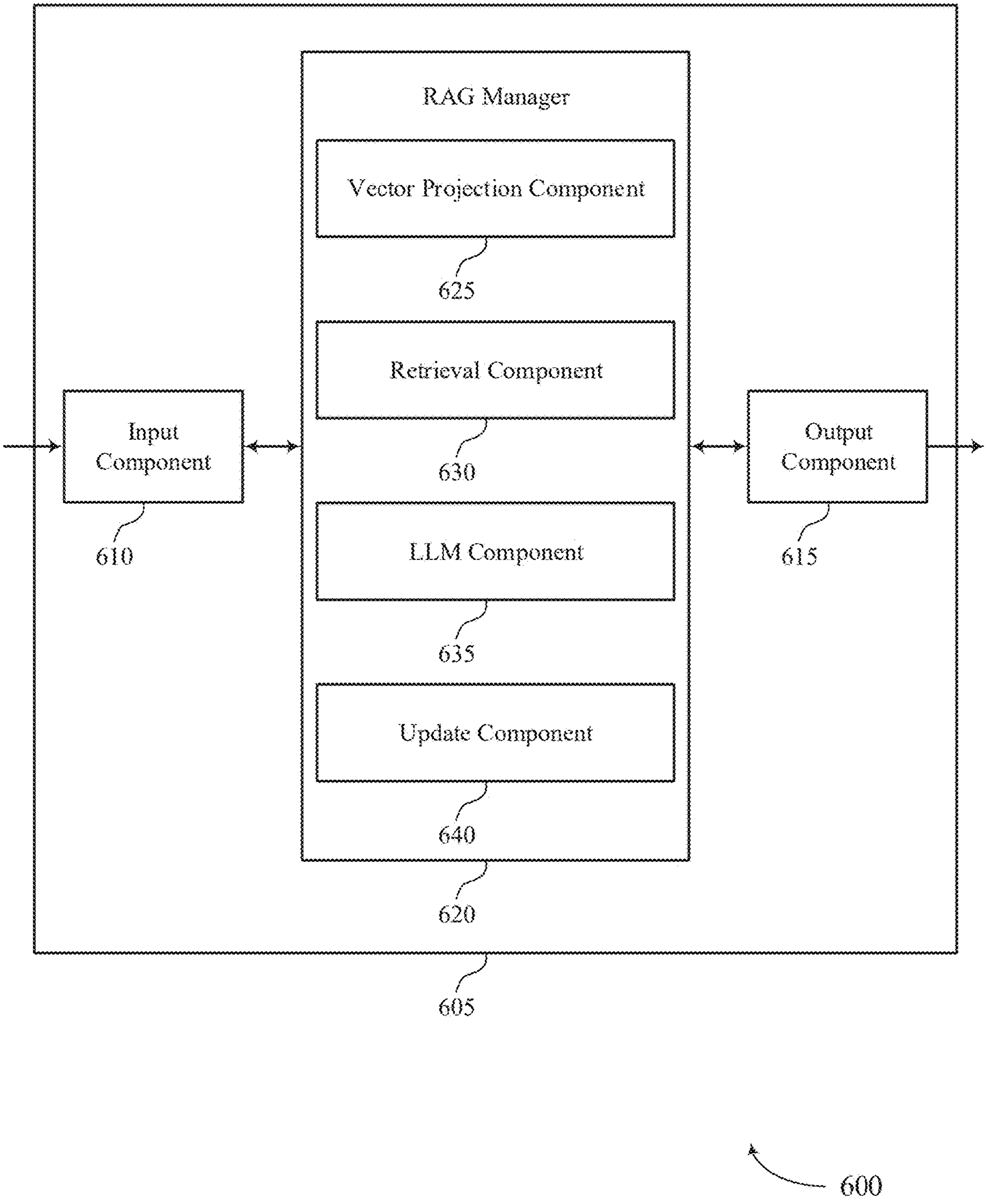
FIG. 6 shows a block diagram of an apparatus that supports contextual retrieval for multi-tenant RAG with adaptive learning in accordance with aspects of the present disclosure.

FIG. 6 shows a block diagram 600 of a device 605 that supports contextual retrieval for multi-tenant RAG with adaptive learning in accordance with aspects of the present disclosure. The device 605 may include an input component 610, an output component 615, and a RAG manager 620. The device 605, or one of more components of the device 605 (e.g., the input component 610, the output component 615, the RAG manager 620), may include at least one processor, which may be coupled with at least one memory, to support the described techniques. Each of these components may be in communication with one another (e.g., via one or more buses).

The input component 610 may manage input signals for the device 605. For example, the input component 610 may identify input signals based on an interaction with a modem, a keyboard, a mouse, a touchscreen, or a similar device. These input signals may be associated with user input or processing at other components or devices. In some cases, the input component 610 may utilize an operating system such as iOS®, ANDROID®, MS-DOS®, MS-WINDOWS®, OS/2®, UNIX®, LINUX®, or another known operating system to handle input signals. The input component 610 may send aspects of these input signals to other components of the device 605 for processing. For example, the input component 610 may transmit input signals to the RAG manager 620 to support contextual retrieval for multi-tenant RAG with adaptive learning. In some cases, the input component 610 may be a component of an input/output (I/O) controller 810 as described with reference to FIG. 8.

The output component 615 may manage output signals for the device 605. For example, the output component 615 may receive signals from other components of the device 605, such as the RAG manager 620, and may transmit these signals to other components or devices. In some examples, the output component 615 may transmit output signals for display via a user interface, for storage in a database or data store, for further processing at a server or server cluster, or for any other processes at any number of devices or systems. In some cases, the output component 615 may be a component of an I/O controller 810 as described with reference to FIG. 8.

The RAG manager 620 may include a vector projection component 625, a retrieval component 630, an LLM component 635, an update component 640, or any combination thereof. In some examples, the RAG manager 620, or various components thereof, may be configured to perform various operations (e.g., receiving, monitoring, transmitting) using or otherwise in cooperation with the input component 610, the output component 615, or both. For example, the RAG manager 620 may receive information from the input component 610, send information to the output component 615, or be integrated in combination with the input component 610, the output component 615, or both to receive information, transmit information, or perform various other operations as described herein.

The RAG manager 620 may support context-based RAG in accordance with examples as disclosed herein. The vector projection component 625 may be configured to support projecting a first set of vectors embedded in a first vector space into a second set of vectors embedded in a second vector space based on a context-based embedding function, a first vector of the first set of vectors corresponding to a second vector of the second set of vectors and representing a first document of a set of documents. The retrieval component 630 may be configured to support retrieving one or more documents of the set of documents based on a query to an LLM and the second set of vectors embedded in the second vector space. The LLM component 635 may be configured to support inputting, to the LLM, a prompt for the LLM, at least one document of the one or more documents, and at least a portion of the query, where the LLM outputs: a result based on the prompt, the at least one document, and the portion of the query; and a confidence metric associated with the result. The update component 640 may be configured to support updating the context-based embedding function based on the at least one document and the confidence metric associated with the result.

Figure 7:
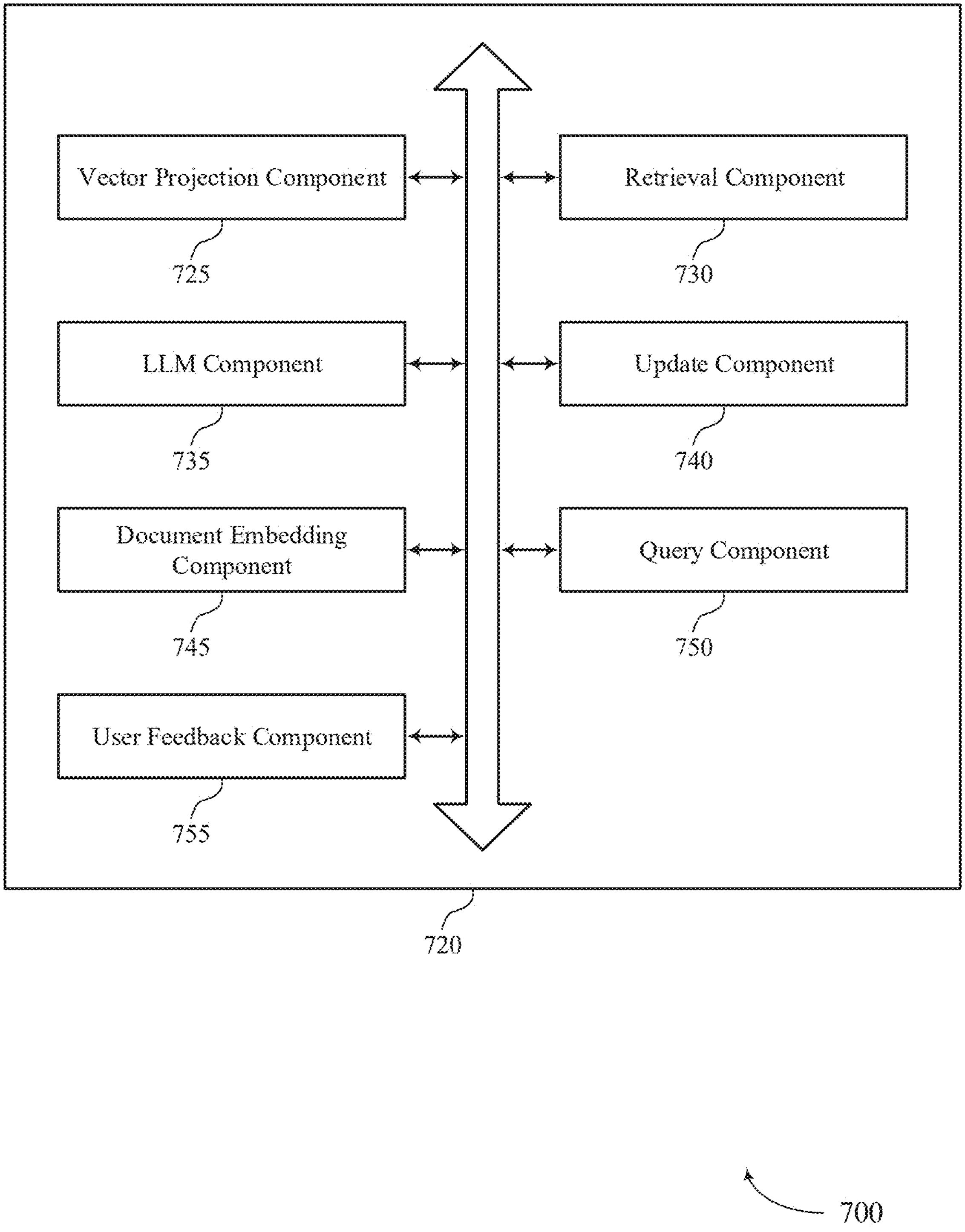
FIG. 7 shows a block diagram of a RAG manager that supports contextual retrieval for multi-tenant RAG with adaptive learning in accordance with aspects of the present disclosure.

FIG. 7 shows a block diagram 700 of a RAG manager 720 that supports contextual retrieval for multi-tenant RAG with adaptive learning in accordance with aspects of the present disclosure. The RAG manager 720 may be an example of aspects of a RAG manager 620 as described herein. The RAG manager 720, or various components thereof, may be an example of means for performing various aspects of contextual retrieval for multi-tenant RAG with adaptive learning as described herein. For example, the RAG manager 720 may include a vector projection component 725, a retrieval component 730, an LLM component 735, an update component 740, a document embedding component 745, a query component 750, a user feedback component 755, or any combination thereof. Each of these components, or components of subcomponents thereof (e.g., one or more processors, one or more memories), may communicate, directly or indirectly, with one another (e.g., via one or more buses).

The RAG manager 720 may support context-based RAG in accordance with examples as disclosed herein. The vector projection component 725 may be configured to support projecting a first set of vectors embedded in a first vector space into a second set of vectors embedded in a second vector space based on a context-based embedding function. A first vector of the first set of vectors may correspond to a second vector of the second set of vectors and may represent a first document of a set of documents. The retrieval component 730 may be configured to support retrieving one or more documents of the set of documents based on a query to an LLM and the second set of vectors embedded in the second vector space. The LLM component 735 may be configured to support inputting, to the LLM, a prompt for the LLM, at least one document of the one or more documents, and at least a portion of the query. The LLM may output a result based on the prompt, the at least one document, and the portion of the query. Additionally, the LLM may output a confidence metric associated with the result. The update component 740 may be configured to support updating the context-based embedding function based on the at least one document and the confidence metric associated with the result.

In some examples, the document embedding component 745 may be configured to support embedding the set of documents as the first set of vectors in the first vector space based on a document embedding function.

In some examples, the document embedding component 745 may be configured to support refraining from updating the document embedding function based on a security parameter of the document embedding function, an owner of the document embedding function, or both. In some examples, the document embedding component 745 may be configured to support applying the updated context-based embedding function to a second document embedding function different from the document embedding function.

In some examples, the query component 750 may be configured to support converting the query into a search vector for the second vector space. In some examples, the retrieval component 730 may be configured to support selecting one or more vectors of the second set of vectors embedded in the second vector space based on a proximity of the search vector to the one or more vectors, where the retrieved one or more documents correspond to the selected one or more vectors.

In some examples, the user feedback component 755 may be configured to support receiving, from a user device, first user feedback indicating an accuracy of the result, where the updating the context-based embedding function is further based on the first user feedback. Additionally, or alternatively, in some examples, the user feedback component 755 may be configured to support receiving, from a user device, second user feedback indicating a relevance of the at least one document, where the updating the context-based embedding function is further based on the second user feedback.

In some examples, the update component 740 may be configured to support determining respective retrieval likelihoods for the one or more documents based on the context-based embedding function, where the updating the context-based embedding function is further based on the respective retrieval likelihoods for the one or more documents and respective confidence metrics for results output based on the one or more documents.

In some examples, the LLM component 735 may be configured to support refraining from updating the LLM based on a security parameter of the LLM, an owner of the LLM, or both. In some examples, the LLM component 735 may be configured to support applying the updated context-based embedding function to a second LLM different from the LLM.

In some examples, the updated context-based embedding function corresponds to a tenant of a multi-tenant database system, the LLM, or both. In some cases, the context-based embedding function may be an example of a one-layer artificial neural network.

Figure 8:
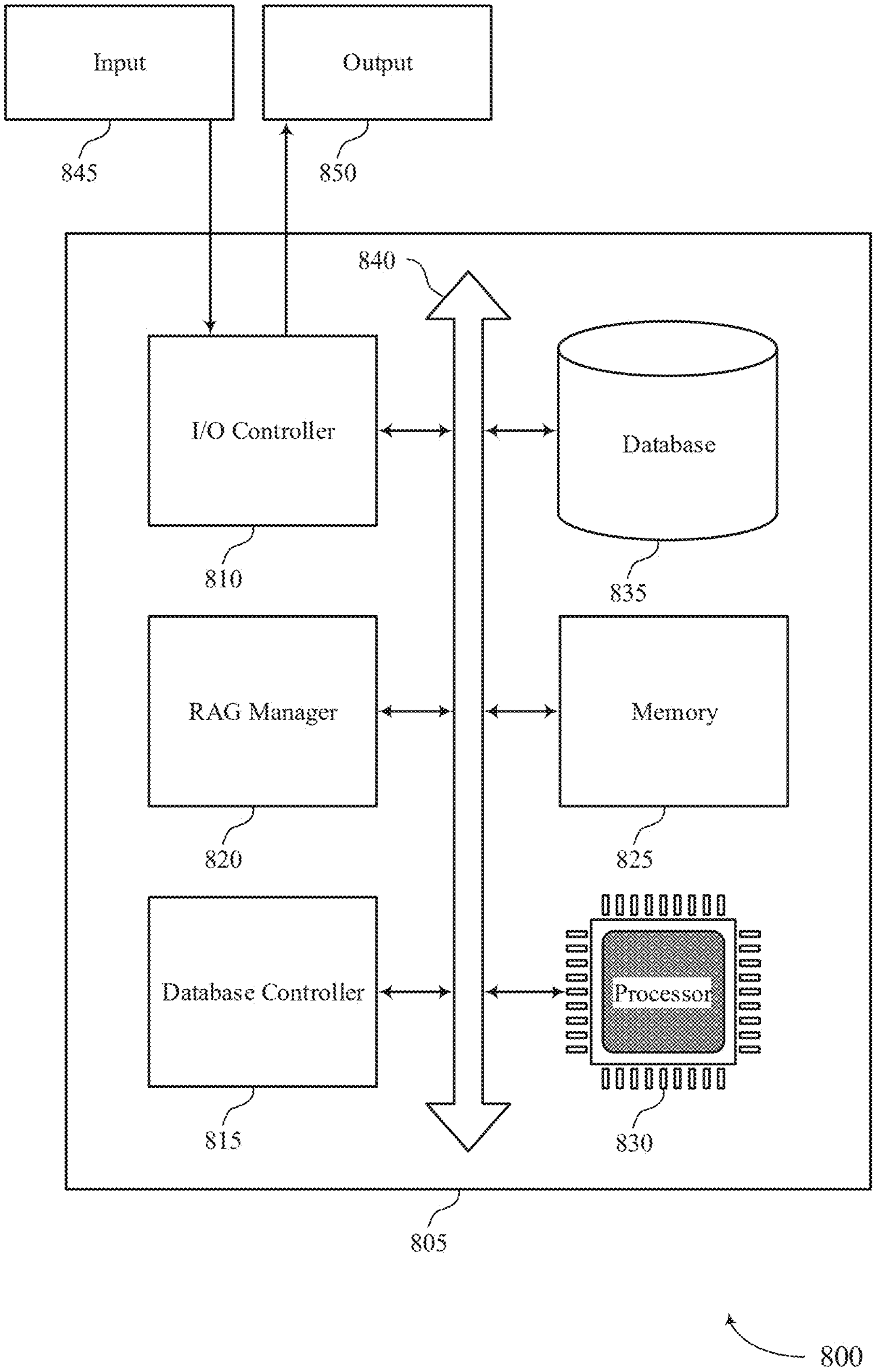
FIG. 8 shows a diagram of a system including a device that supports contextual retrieval for multi-tenant RAG with adaptive learning in accordance with aspects of the present disclosure.

FIG. 8 shows a diagram of a system 800 including a device 805 that supports contextual retrieval for multi-tenant RAG with adaptive learning in accordance with aspects of the present disclosure. The device 805 may be an example of or include components of a device 605 as described herein. The device 805 may include components for bi-directional data communications including components for transmitting and receiving communications, such as a RAG manager 820, an I/O controller, such as an I/O controller 810, a database controller 815, at least one memory 825, at least one processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause at least one processor 830 to perform various functions described herein. In some cases, the memory 825 may contain, among other things, a basic I/O system (BIOS) which may control basic hardware or software operation such as the interaction with peripheral components or devices. The memory 825 may be an example of a single memory or multiple memories. For example, the device 805 may include one or more memories 825.

The processor 830 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in at least one memory 825 to perform various functions (e.g., functions or tasks supporting contextual retrieval for multi-tenant RAG with adaptive learning). The processor 830 may be an example of a single processor or multiple processors. For example, the device 805 may include one or more processors 830.

The RAG manager 820 may support context-based RAG in accordance with examples as disclosed herein. For example, the RAG manager 820 may be configured to support projecting a first set of vectors embedded in a first vector space into a second set of vectors embedded in a second vector space based on a context-based embedding function. A first vector of the first set of vectors may correspond to a second vector of the second set of vectors and may represent a first document of a set of documents. The RAG manager 820 may be configured to support retrieving one or more documents of the set of documents based on a query to an LLM and the second set of vectors embedded in the second vector space. The RAG manager 820 may be configured to support inputting, to the LLM, a prompt for the LLM, at least one document of the one or more documents, and at least a portion of the query. In response, the LLM may output: a result based on the prompt, the at least one document, and the portion of the query; and a confidence metric associated with the result. The RAG manager 820 may be configured to support updating the context-based embedding function based on the at least one document and the confidence metric associated with the result.

Figure 9:
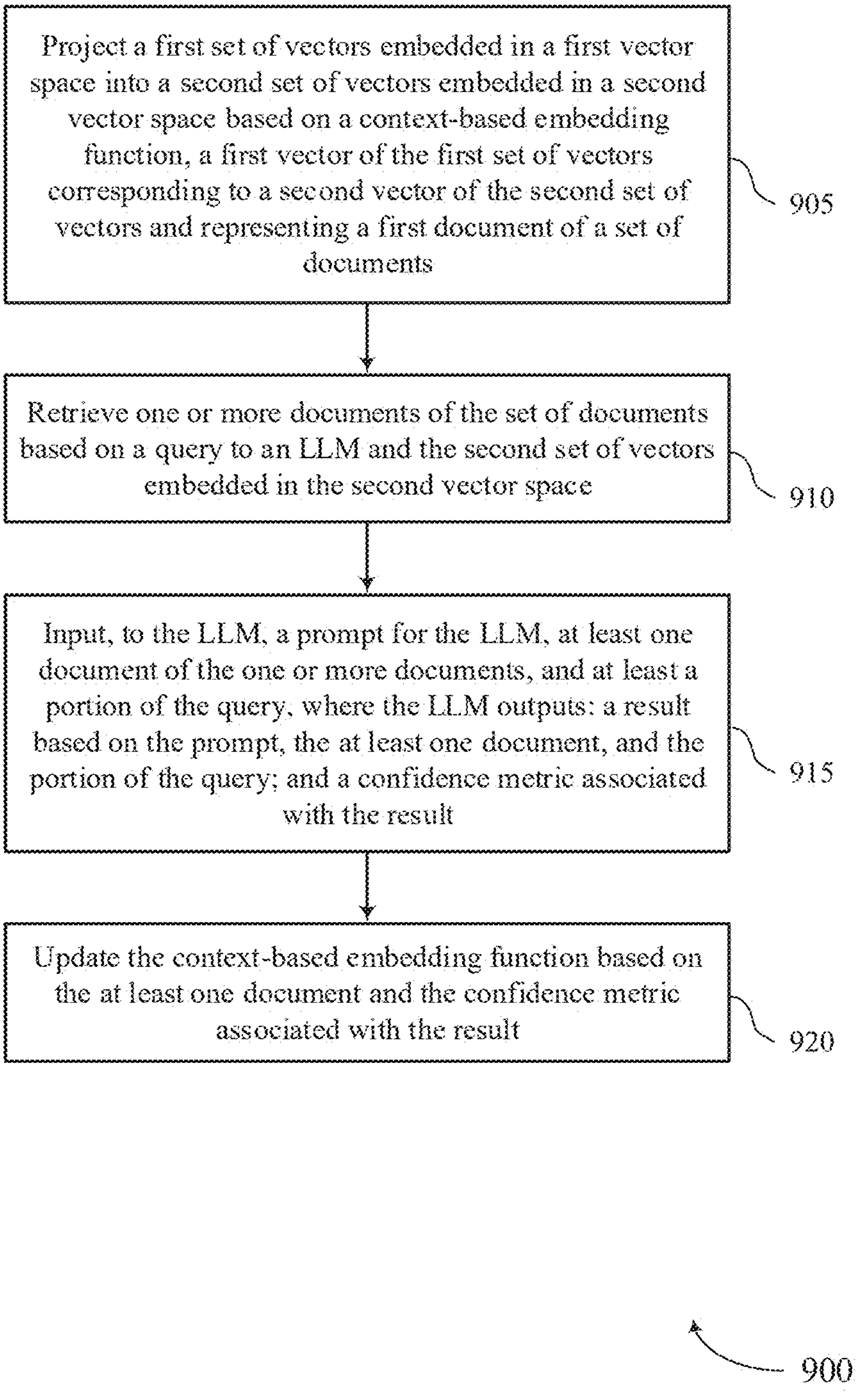
FIGS. 9 and 10 show flowcharts illustrating methods that support contextual retrieval for multi-tenant RAG with adaptive learning in accordance with aspects of the present disclosure.

FIG. 9 shows a flowchart illustrating a method 900 that supports contextual retrieval for multi-tenant RAG with adaptive learning in accordance with aspects of the present disclosure. The operations of the method 900 may be implemented by a processing device or its components as described herein. For example, the operations of the method 900 may be performed by a processing device or system, such as an application server, a database server, a cloud-based server or service, a worker server, a server cluster, a virtual machine, a container, a network device, a user device, or any combination of these or other computing devices as described with reference to FIGS. 1 through 8. In some examples, a processing device may execute a set of instructions to control the functional elements of the processing device to perform the described functions. Additionally, or alternatively, the processing device may perform aspects of the described functions using special-purpose hardware.

At 905, the method may include projecting a first set of vectors embedded in a first vector space into a second set of vectors embedded in a second vector space based on a context-based embedding function. A first vector of the first set of vectors may correspond to a second vector of the second set of vectors and may represent a first document of a set of documents. The operations of 905 may be performed in accordance with examples as disclosed herein. In some examples, aspects of the operations of 905 may be performed by a vector projection component 725 as described with reference to FIG. 7.

At 910, the method may include retrieving one or more documents of the set of documents based on a query to an LLM and the second set of vectors embedded in the second vector space. The operations of 910 may be performed in accordance with examples as disclosed herein. In some examples, aspects of the operations of 910 may be performed by a retrieval component 730 as described with reference to FIG. 7.

At 915, the method may include inputting, to the LLM, a prompt for the LLM, at least one document of the one or more documents, and at least a portion of the query, where the LLM outputs: a result based on the prompt, the at least one document, and the portion of the query; and a confidence metric associated with the result. The operations of 915 may be performed in accordance with examples as disclosed herein. In some examples, aspects of the operations of 915 may be performed by an LLM component 735 as described with reference to FIG. 7.

At 920, the method may include updating the context-based embedding function based on the at least one document and the confidence metric associated with the result. The operations of 920 may be performed in accordance with examples as disclosed herein. In some examples, aspects of the operations of 920 may be performed by an update component 740 as described with reference to FIG. 7.

Figure 10:
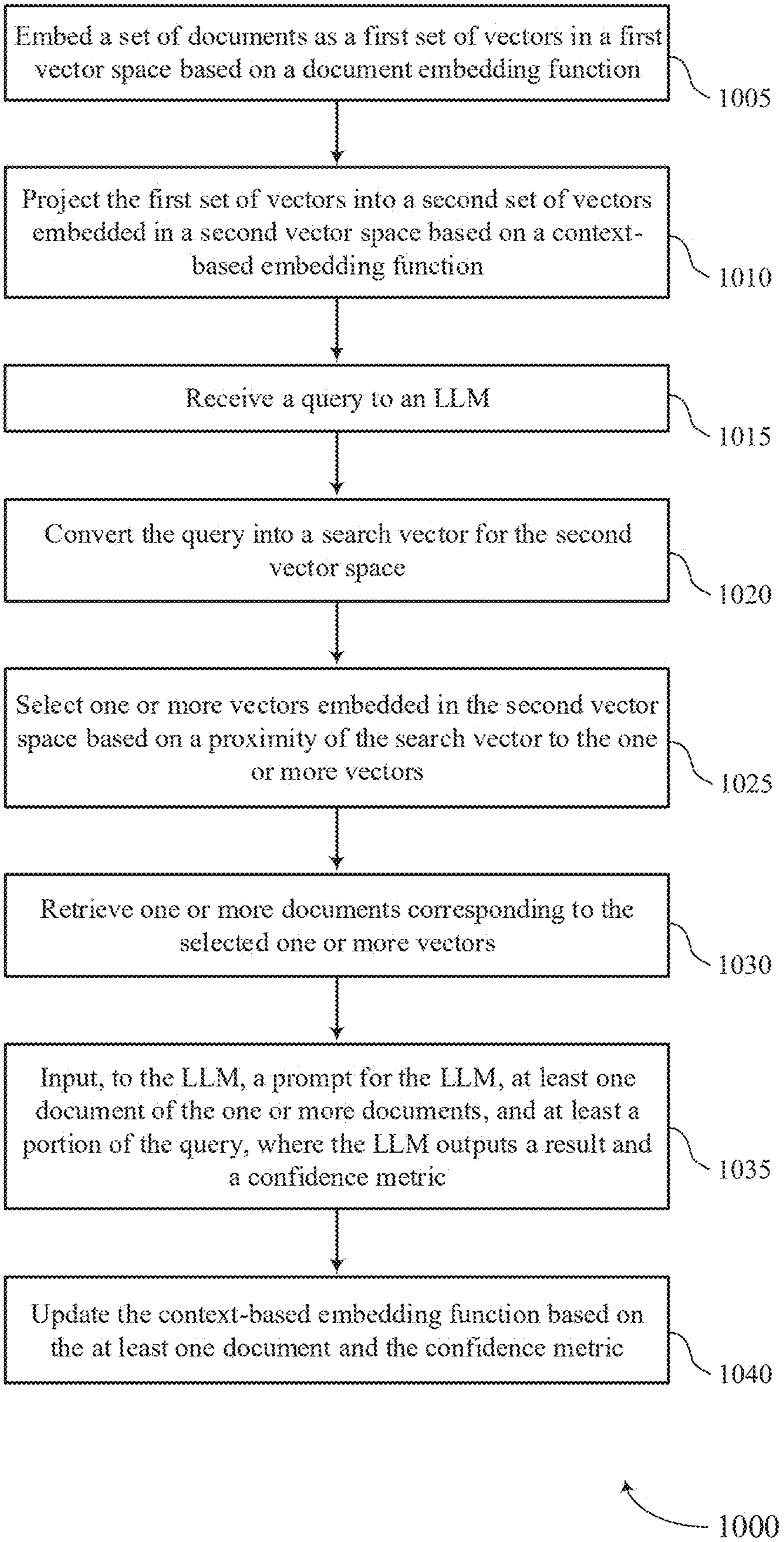

FIG. 10 shows a flowchart illustrating a method 1000 that supports contextual retrieval for multi-tenant RAG with adaptive learning in accordance with aspects of the present disclosure. The operations of the method 1000 may be implemented by a processing device or its components as described herein. For example, the operations of the method 1000 may be performed by a processing device or system, such as an application server, a database server, a cloud-based server or service, a worker server, a server cluster, a virtual machine, a container, a network device, a user device, or any combination of these or other computing devices as described with reference to FIGS. 1 through 8. In some examples, a processing device may execute a set of instructions to control the functional elements of the processing device to perform the described functions. Additionally, or alternatively, the processing device may perform aspects of the described functions using special-purpose hardware.

At 1005, the method may include embedding a set of documents as a first set of vectors in a first vector space based on a document embedding function. The operations of 1005 may be performed in accordance with examples as disclosed herein. In some examples, aspects of the operations of 1005 may be performed by a document embedding component 745 as described with reference to FIG. 7.

At 1010, the method may include projecting the first set of vectors into a second set of vectors embedded in a second vector space based on a context-based embedding function. A first vector of the first set of vectors may correspond to a second vector of the second set of vectors, where both the first vector and the second vector represent a first document of the set of documents embedded in the different vector spaces. The operations of 1010 may be performed in accordance with examples as disclosed herein. In some examples, aspects of the operations of 1010 may be performed by a vector projection component 725 as described with reference to FIG. 7.

At 1015, the method may include receiving a query to an LLM. In some examples, the method may include receiving the query from a user device (e.g., via a user interface). The operations of 1015 may be performed in accordance with examples as disclosed herein. In some examples, aspects of the operations of 1015 may be performed by a query component 750 as described with reference to FIG. 7.

At 1020, the method may include converting the query into a search vector for the second vector space. The operations of 1020 may be performed in accordance with examples as disclosed herein. In some examples, aspects of the operations of 1020 may be performed by a query component 750 as described with reference to FIG. 7.

At 1025, the method may include selecting one or more vectors of the second set of vectors embedded in the second vector space based on a proximity of the search vector to the one or more vectors. The operations of 1025 may be performed in accordance with examples as disclosed herein. In some examples, aspects of the operations of 1025 may be performed by a retrieval component 730 as described with reference to FIG. 7.

At 1030, the method may include retrieving one or more documents corresponding to the selected one or more vectors. The operations of 1030 may be performed in accordance with examples as disclosed herein. In some examples, aspects of the operations of 1030 may be performed by a retrieval component 730 as described with reference to FIG. 7.

At 1035, the method may include inputting, to the LLM, a prompt for the LLM, at least one document of the one or more documents, and at least a portion of the query. In response, the LLM may output a result based on the prompt, the at least one document, and the portion of the query. Additionally, the LLM may output a confidence metric associated with the result. The operations of 1035 may be performed in accordance with examples as disclosed herein. In some examples, aspects of the operations of 1035 may be performed by an LLM component 735 as described with reference to FIG. 7.

At 1040, the method may include updating the context-based embedding function based on the at least one document and the confidence metric associated with the result. The operations of 1040 may be performed in accordance with examples as disclosed herein. In some examples, aspects of the operations of 1040 may be performed by an update component 740 as described with reference to FIG. 7.

A method for context-based RAG is described. The method may include projecting a first set of vectors embedded in a first vector space into a second set of vectors embedded in a second vector space based on a context-based embedding function, a first vector of the first set of vectors corresponding to a second vector of the second set of vectors and representing a first document of a set of documents. The method may further include retrieving one or more documents of the set of documents based on a query to an LLM and the second set of vectors embedded in the second vector space and inputting, to the LLM, a prompt for the LLM, at least one document of the one or more documents, and at least a portion of the query, where the LLM outputs: a result based on the prompt, the at least one document, and the portion of the query; and a confidence metric associated with the result. The method may further include updating the context-based embedding function based on the at least one document and the confidence metric associated with the result.

An apparatus for context-based RAG is described. The apparatus may include one or more memories storing processor executable code and one or more processors coupled with the one or more memories. The one or more processors may individually or collectively be operable to execute the code to cause the apparatus to project a first set of vectors embedded in a first vector space into a second set of vectors embedded in a second vector space based on a context-based embedding function, a first vector of the first set of vectors corresponding to a second vector of the second set of vectors and representing a first document of a set of documents. The one or more processors may individually or collectively be further operable to execute the code to cause the apparatus to retrieve one or more documents of the set of documents based on a query to an LLM and the second set of vectors embedded in the second vector space and input, to the LLM, a prompt for the LLM, at least one document of the one or more documents, and at least a portion of the query, where the LLM outputs: a result based on the prompt, the at least one document, and the portion of the query; and a confidence metric associated with the result. The one or more processors may individually or collectively be further operable to execute the code to cause the apparatus to update the context-based embedding function based on the at least one document and the confidence metric associated with the result.

Another apparatus for context-based RAG is described. The apparatus may include means for projecting a first set of vectors embedded in a first vector space into a second set of vectors embedded in a second vector space based on a context-based embedding function, a first vector of the first set of vectors corresponding to a second vector of the second set of vectors and representing a first document of a set of documents. The apparatus may further include means for retrieving one or more documents of the set of documents based on a query to an LLM and the second set of vectors embedded in the second vector space and means for inputting, to the LLM, a prompt for the LLM, at least one document of the one or more documents, and at least a portion of the query, where the LLM outputs: a result based on the prompt, the at least one document, and the portion of the query; and a confidence metric associated with the result. The apparatus may further include means for updating the context-based embedding function based on the at least one document and the confidence metric associated with the result.

A non-transitory computer-readable medium storing code for context-based RAG is described. The code may include instructions executable by one or more processors to project a first set of vectors embedded in a first vector space into a second set of vectors embedded in a second vector space based on a context-based embedding function, a first vector of the first set of vectors corresponding to a second vector of the second set of vectors and representing a first document of a set of documents. The code may further include instructions executable by the one or more processors to retrieve one or more documents of the set of documents based on a query to an LLM and the second set of vectors embedded in the second vector space and input, to the LLM, a prompt for the LLM, at least one document of the one or more documents, and at least a portion of the query, where the LLM outputs: a result based on the prompt, the at least one document, and the portion of the query; and a confidence metric associated with the result. The code may further include instructions executable by the one or more processors to update the context-based embedding function based on the at least one document and the confidence metric associated with the result.

Some examples of the method, apparatuses, and non-transitory computer-readable medium described herein may further include operations, features, means, or instructions for embedding the set of documents as the first set of vectors in the first vector space based on a document embedding function.

Some examples of the method, apparatuses, and non-transitory computer-readable medium described herein may further include operations, features, means, or instructions for refraining from updating the document embedding function based on a security parameter of the document embedding function, an owner of the document embedding function, or both. Some examples of the method, apparatuses, and non-transitory computer-readable medium described herein may further include operations, features, means, or instructions for applying the updated context-based embedding function to a second document embedding function different from the document embedding function.

Some examples of the method, apparatuses, and non-transitory computer-readable medium described herein may further include operations, features, means, or instructions for converting the query into a search vector for the second vector space and selecting one or more vectors of the second set of vectors embedded in the second vector space based on a proximity of the search vector to the one or more vectors, where the retrieved one or more documents correspond to the selected one or more vectors.

Some examples of the method, apparatuses, and non-transitory computer-readable medium described herein may further include operations, features, means, or instructions for receiving, from a user device, first user feedback indicating an accuracy of the result, where the updating the context-based embedding function may be further based on the first user feedback. Some examples of the method, apparatuses, and non-transitory computer-readable medium described herein may further include operations, features, means, or instructions for receiving, from a user device, second user feedback indicating a relevance of the at least one document, where the updating the context-based embedding function may be further based on the second user feedback.

Some examples of the method, apparatuses, and non-transitory computer-readable medium described herein may further include operations, features, means, or instructions for determining respective retrieval likelihoods for the one or more documents based on the context-based embedding function, where the updating the context-based embedding function may be further based on the respective retrieval likelihoods for the one or more documents and respective confidence metrics for results output based on the one or more documents.

Some examples of the method, apparatuses, and non-transitory computer-readable medium described herein may further include operations, features, means, or instructions for refraining from updating the LLM based on a security parameter of the LLM, an owner of the LLM, or both. Some examples of the method, apparatuses, and non-transitory computer-readable medium described herein may further include operations, features, means, or instructions for applying the updated context-based embedding function to a second LLM different from the LLM.

In some examples of the method, apparatuses, and non-transitory computer-readable medium described herein, the updated context-based embedding function corresponds to a tenant of a multi-tenant database system, the LLM, or both. In some examples of the method, apparatuses, and non-transitory computer-readable medium described herein, the context-based embedding function includes a one-layer artificial neural network.

The following provides an overview of aspects of the present disclosure:

Aspect 1: A method for context-based RAG, comprising: projecting a first set of vectors embedded in a first vector space into a second set of vectors embedded in a second vector space based at least in part on a context-based embedding function, a first vector of the first set of vectors corresponding to a second vector of the second set of vectors and representing a first document of a set of documents; retrieving one or more documents of the set of documents based at least in part on a query to an LLM and the second set of vectors embedded in the second vector space; inputting, to the LLM, a prompt for the LLM, at least one document of the one or more documents, and at least a portion of the query, wherein the LLM outputs: a result based at least in part on the prompt, the at least one document, and the portion of the query; and a confidence metric associated with the result; and updating the context-based embedding function based at least in part on the at least one document and the confidence metric associated with the result.

Aspect 2: The method of aspect 1, further comprising: embedding the set of documents as the first set of vectors in the first vector space based at least in part on a document embedding function.

Aspect 3: The method of aspect 2, further comprising: refraining from updating the document embedding function based at least in part on a security parameter of the document embedding function, an owner of the document embedding function, or both.

Aspect 4: The method of either of aspects 2 or 3, further comprising: applying the updated context-based embedding function to a second document embedding function different from the document embedding function.

Aspect 5: The method of any of aspects 1 through 4, further comprising: converting the query into a search vector for the second vector space; and selecting one or more vectors of the second set of vectors embedded in the second vector space based at least in part on a proximity of the search vector to the one or more vectors, wherein the retrieved one or more documents correspond to the selected one or more vectors.

Aspect 6: The method of any of aspects 1 through 5, further comprising: receiving, from a user device, first user feedback indicating an accuracy of the result, wherein the updating the context-based embedding function is further based at least in part on the first user feedback.

Aspect 7: The method of any of aspects 1 through 6, further comprising: receiving, from a user device, second user feedback indicating a relevance of the at least one document, wherein the updating the context-based embedding function is further based at least in part on the second user feedback.

Aspect 8: The method of any of aspects 1 through 7, further comprising: determining respective retrieval likelihoods for the one or more documents based at least in part on the context-based embedding function, wherein the updating the context-based embedding function is further based at least in part on the respective retrieval likelihoods for the one or more documents and respective confidence metrics for results output based at least in part on the one or more documents.

Aspect 9: The method of any of aspects 1 through 8, further comprising: refraining from updating the LLM based at least in part on a security parameter of the LLM, an owner of the LLM, or both.

Aspect 10: The method of any of aspects 1 through 9, further comprising: applying the updated context-based embedding function to a second LLM different from the LLM.

Aspect 11: The method of any of aspects 1 through 10, wherein the updated context-based embedding function corresponds to a tenant of a multi-tenant database system, the LLM, or both.

Aspect 12: The method of any of aspects 1 through 11, wherein the context-based embedding function comprises a one-layer artificial neural network.

Aspect 13: An apparatus for context-based RAG, comprising: one or more memories storing processor-executable code; and one or more processors coupled with the one or more memories and individually or collectively operable to execute the code to cause the apparatus to perform a method of any of aspects 1 through 12.

Aspect 14: An apparatus for context-based RAG, comprising at least one means for performing a method of any of aspects 1 through 12.

Aspect 15: A non-transitory computer-readable medium storing code for context-based RAG, the code comprising instructions executable by one or more processors to perform a method of any of aspects 1 through 12.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for context-based retrieval-augmented generation (RAG), comprising:

projecting a first set of vectors embedded in a first vector space into a second set of vectors embedded in a second vector space based at least in part on a context-based embedding function, a first vector of the first set of vectors corresponding to a second vector of the second set of vectors and representing a first document of a set of documents, wherein the second vector space is different from the first vector space;

retrieving one or more documents of the set of documents based at least in part on a query to a large language model (LLM) and the second set of vectors embedded in the second vector space;

inputting, to the LLM, a prompt for the LLM, at least one document of the one or more documents, and at least a portion of the query, wherein the LLM outputs:

a result based at least in part on the prompt, the at least one document, and the portion of the query, and a confidence metric associated with the result; and updating the context-based embedding function based at least in part on the at least one document and the confidence metric associated with the result.

2. The method of claim 1, further comprising:

embedding the set of documents as the first set of vectors in the first vector space based at least in part on a document embedding function.

3. The method of claim 2, further comprising:

refraining from updating the document embedding function based at least in part on a security parameter of the document embedding function, an owner of the document embedding function, or both.

4. The method of claim 2, further comprising:

applying the updated context-based embedding function to a second document embedding function different from the document embedding function.

5. The method of claim 1, further comprising:

converting the query into a search vector for the second vector space; and selecting one or more vectors of the second set of vectors embedded in the second vector space based at least in part on a proximity of the search vector to the one or more vectors, wherein the retrieved one or more documents correspond to the selected one or more vectors.

6. The method of claim 1, further comprising:

receiving, from a user device, first user feedback indicating an accuracy of the result, wherein the updating the context-based embedding function is further based at least in part on the first user feedback.

7. The method of claim 1, further comprising:

receiving, from a user device, second user feedback indicating a relevance of the at least one document, wherein the updating the context-based embedding function is further based at least in part on the second user feedback.

8. The method of claim 1, further comprising:

determining respective retrieval likelihoods for the one or more documents based at least in part on the context-based embedding function, wherein the updating the context-based embedding function is further based at least in part on the respective retrieval likelihoods for the one or more documents and respective confidence metrics for results output based at least in part on the one or more documents.

9. The method of claim 1, further comprising:

refraining from updating the LLM based at least in part on a security parameter of the LLM, an owner of the LLM, or both.

10. The method of claim 1, further comprising:

applying the updated context-based embedding function to a second LLM different from the LLM.

11. The method of claim 1, wherein the updated context-based embedding function corresponds to a tenant of a multi-tenant database system, the LLM, or both.

12. The method of claim 1, wherein the context-based embedding function comprises a one-layer artificial neural network.

13. An apparatus for context-based retrieval-augmented generation (RAG), comprising:

one or more memories storing processor-executable code; and one or more processors coupled with the one or more memories and individually or collectively operable to execute the code to cause the apparatus to:

project a first set of vectors embedded in a first vector space into a second set of vectors embedded in a second vector space based at least in part on a context-based embedding function, a first vector of the first set of vectors corresponding to a second vector of the second set of vectors and representing a first document of a set of documents, wherein the second vector space is different from the first vector space;

retrieve one or more documents of the set of documents based at least in part on a query to a large language model (LLM) and the second set of vectors embedded in the second vector space;

input, to the LLM, a prompt for the LLM, at least one document of the one or more documents, and at least a portion of the query, wherein the LLM outputs:

a result based at least in part on the prompt, the at least one document, and the portion of the query, and a confidence metric associated with the result; and update the context-based embedding function based at least in part on the at least one document and the confidence metric associated with the result.

14. The apparatus of claim 13, wherein the one or more processors are individually or collectively further operable to execute the code to cause the apparatus to:

embed the set of documents as the first set of vectors in the first vector space based at least in part on a document embedding function.

15. The apparatus of claim 14, wherein the one or more processors are individually or collectively further operable to execute the code to cause the apparatus to:

refrain from updating the document embedding function based at least in part on a security parameter of the document embedding function, an owner of the document embedding function, or both.

16. The apparatus of claim 14, wherein the one or more processors are individually or collectively further operable to execute the code to cause the apparatus to:

apply the updated context-based embedding function to a second document embedding function different from the document embedding function.

17. The apparatus of claim 13, wherein the one or more processors are individually or collectively further operable to execute the code to cause the apparatus to:

convert the query into a search vector for the second vector space; and select one or more vectors of the second set of vectors embedded in the second vector space based at least in part on a proximity of the search vector to the one or more vectors, wherein the retrieved one or more documents correspond to the selected one or more vectors.

18. The apparatus of claim 13, wherein the one or more processors are individually or collectively further operable to execute the code to cause the apparatus to:

receive, from a user device, first user feedback indicating an accuracy of the result, wherein the updating the context-based embedding function is further based at least in part on the first user feedback.

19. The apparatus of claim 13, wherein the one or more processors are individually or collectively further operable to execute the code to cause the apparatus to:

receive, from a user device, second user feedback indicating a relevance of the at least one document, wherein the updating the context-based embedding function is further based at least in part on the second user feedback.

20. A non-transitory computer-readable medium storing code for context-based retrieval-augmented generation (RAG), the code comprising instructions executable by one or more processors to:

project a first set of vectors embedded in a first vector space into a second set of vectors embedded in a second vector space based at least in part on a context-based embedding function, a first vector of the first set of vectors corresponding to a second vector of the second set of vectors and representing a first document of a set of documents, wherein the second vector space is different from the first vector space;

retrieve one or more documents of the set of documents based at least in part on a query to a large language model (LLM) and the second set of vectors embedded in the second vector space;

input, to the LLM, a prompt for the LLM, at least one document of the one or more documents, and at least a portion of the query, wherein the LLM outputs:

a result based at least in part on the prompt, the at least one document, and the portion of the query, and a confidence metric associated with the result; and update the context-based embedding function based at least in part on the at least one document and the confidence metric associated with the result.

* * * * *